(12) United States Patent
Lee et al.

(10) Patent No.: US 11,808,516 B2
(45) Date of Patent: Nov. 7, 2023

(54) HOME APPLIANCE INCLUDING DISPLAY MODULE

(71) Applicant: Samsung Electronics Co., Ltd., Suwon-si (KR)

(72) Inventors: Honguk Lee, Suwon-si (KR); Simon Ireland, Suwon-si (KR); Anthony O'Sullivan, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 548 days.

(21) Appl. No.: 16/946,039

(22) Filed: Jun. 3, 2020

(65) Prior Publication Data

US 2020/0378679 A1 Dec. 3, 2020

(30) Foreign Application Priority Data

Jun. 3, 2019 (KR) .................. 10-2019-0065628

(51) Int. Cl.
*F25D 29/00* (2006.01)
*F25D 23/02* (2006.01)

(52) U.S. Cl.
CPC ......... *F25D 29/003* (2013.01); *F25D 23/028* (2013.01); *F25D 29/005* (2013.01); *F25D 2400/361* (2013.01)

(58) Field of Classification Search
CPC ..... F25D 29/003; F25D 23/028; F25D 29/005
See application file for complete search history.

(56) References Cited

U.S. PATENT DOCUMENTS

| | | | |
|---|---|---|---|
| 7,644,897 B2 | 1/2010 | Shin | |
| 7,870,753 B2 * | 1/2011 | Marcy | ............... G06F 1/166 62/331 |
| 8,035,958 B2 | 10/2011 | Kendall et al. | |
| | (Continued) | | |

FOREIGN PATENT DOCUMENTS

| | | |
|---|---|---|
| JP | S6095767 U | 5/1985 |
| KR | 10-2004-0085756 A | 10/2004 |
| | (Continued) | |

OTHER PUBLICATIONS

International Search Report dated Sep. 17, 2020 in connection with International Patent Application No. PCT/KR2020/007201, 3 pages.

(Continued)

*Primary Examiner* — Elizabeth J Martin
*Assistant Examiner* — Samba N M N Gaye

(57) ABSTRACT

A refrigerator including a display module that is movable upward and downward and rotatable. The refrigerator includes a main body forming a storage compartment, a door configured to open and close the storage compartment, a display module coupled to the door, and a sliding plate disposed between the door and display module and coupled to be slidable in upper side and lower side directions with respect to the door and configured to allow the display module to be rotatably coupled thereto. The display module is provided to, when the sliding plate slides in the upper side and lower side directions, slide in the upper side and lower side directions with respect to the door together with the sliding plate, and rotate with respect to the door as the display module rotates with respect to the sliding plate.

15 Claims, 26 Drawing Sheets

(56) References Cited

U.S. PATENT DOCUMENTS

2004/0084585 A1    5/2004   Watanabe et al.
2007/0262209 A1   11/2007   She et al.
2008/0165282 A1    7/2008   Marcy et al.
2009/0159760 A1    6/2009   Gan et al.
2018/0356027 A1   12/2018   Kim

FOREIGN PATENT DOCUMENTS

| KR | 100582075 B1 | 5/2006 |
| KR | 10-2006-0074525 A | 7/2006 |
| KR | 10-0630938 B1 | 10/2006 |
| KR | 10-0705069 B1 | 4/2007 |
| KR | 20070055812 A | 5/2007 |
| KR | 10-2012-0072758 A | 7/2012 |
| KR | 10-1164820 B1 | 7/2012 |
| KR | 10-1325770 B1 | 11/2013 |

OTHER PUBLICATIONS

European Patent Office, "Supplementary European Search Report" dated Apr. 20, 2022, in connection with European Patent Application No. 20818504.1, 9 pages.

\* cited by examiner

HOME APPLIANCE INCLUDING DISPLAY MODULE

CROSS-REFERENCE TO RELATED APPLICATION

This application is based on and claims priority under 35 U.S.C. § 119 to Korean Patent Applications No. 2019-0065628, filed on Jun. 3, 2019 in the Korean Intellectual Property Office, the disclosure of which is incorporated herein by reference.

BACKGROUND

1. Field

The disclosure relates to a home appliance, and more specifically, to a home appliance including a display module capable of rotating and moving upward and downward.

2. Description of the Related Art

Home appliances are electrical appliances used at home. The home appliances include refrigerators, washing machines, and air conditioners, and perform may household chores or enhance the efficiency of household chores.

A refrigerator, which is an example of a home appliance, is a device including a main body having a storage compartment and a cold air supply system for supplying cold air to the storage compartment to keep food items fresh. The storage compartment includes a refrigerating compartment that stores food refrigerated at approximately 0° C. to 5° C. and a freezing compartment that stores food frozen at approximately 0° C. to −30° C.

Unlike the conventional refrigerators only equipped with a function of storing food at a low temperature, refrigerators of today are equipped with other functions in addition to the food storage function.

For example, the refrigerator may include a display capable of displaying various pieces of information and receiving various commands from a user. Such a display may be installed on a door of the refrigerator so that a user may access the display without opening the door of the refrigerator.

When the position of the display provided on the door of the refrigerator is fixed, various users with different heights may have difficulty in conveniently using the refrigerator. This is because when the position of the display is selected according to the height of adults, the position of the display is too high for children, and when the position of the display is selected according to the height of children, the position of the display is too low for adults.

In addition, when the rotation of the display is limited, both a horizontal image and a vertical image may not be effectively displayed.

In addition, when the display module is embedded into of the door of the refrigerator, the thickness of the refrigerator door increases, which causes the capacity of the storage compartment to be reduced.

SUMMARY

Therefore, it is an object of the disclosure to provide a refrigerator including a display module of which the position is adjustable in upper side and lower side directions.

It is another object of the disclosure to provide a refrigerator including a display module that is rotatable.

It is another object of the disclosure to provide a refrigerator in which the capacity of a storage compartment is secured by disposing a display module outside a door.

It is another object of the disclosure to provide a refrigerator having a simple design without having a component protruding to the outside of the door when a display module rotates or moves up and down.

Additional aspects of the disclosure will be set forth in part in the description which follows and, in part, will be obvious from the description, or may be learned by practice of the disclosure.

Therefore, it is an aspect of the disclosure to provide a refrigerator including: a main body forming a storage compartment; a door configured to open and close the storage compartment; a display module coupled to the door; and a sliding plate disposed between the door and display module, and coupled to be slidable in upper side and lower side directions with respect to the door and allowing the display module to be rotatably coupled thereto, wherein the display module is provided to: when the sliding plate slides in the upper side and lower side directions, slide in the upper side and lower side directions with respect to the door together with the sliding plate; and as the display module rotates with respect to the sliding plate, the display module rotates with respect to the door.

The sliding plate may not protrude outside of the display module when the display module moves in the upper side and lower directions or rotates.

The display module may have a short side that is greater or equal to a height of the sliding plate.

The refrigerator may further include: a mount fixed to the door and allowing the sliding plate to be slidably coupled thereto; and a lock release device configured to release locking of the display module that is locked to be prevented from moving in the upper side and lower side directions.

The refrigerator may further include a locking member coupled to the mount so as to be movable in a first direction with respect to the mount and a second direction opposite to the first direction, wherein the locking member may be inserted into a locking groove formed in a rear surface of the sliding plate to restrict the upper and lower side movement of the sliding plate.

The refrigerator may further include an elastic member coupled to the mount and the locking member to elastically bias the locking member in the first direction.

The lock release device may include: a push member provided to be movable with respect to the display module; and a rotation lever provided to be rotatable by the movement of the push member.

The rotation lever may include: a first rotation lever that is rotated; to move the locking member in the second direction when the display module is arranged in a first mode; and a second rotation lever that is rotated to move the locking member in the second direction when the display module is arranged in a second mode rotated from the first mode.

The mount may include a roller rotatably coupled to the mount, wherein the sliding plate further includes a rail that guides movement of the roller.

The sliding plate may further include a rack provided in parallel with the rail, wherein the mount may include a rotating damper having a pinion mating with the rack and configured to adjust a rotation speed of the pinion to adjust a moving speed of the sliding plate.

The display module may include: a fixed plate disposed at an inside of the display module and coupled to the sliding plate; and a rotating plate disposed between the fixed plate and the sliding plate and provided to be rotatable with respect to the fixed plate and the sliding plate.

The fixed plate may include a stopper that protrudes from the fixed plate, and the rotating plate may include a stopper groove configured to restrict a movable range of the stopper to restrict a rotatable range of the display module.

The refrigerator may further include: a mount fixedly coupled to the door and including an elastic protrusion protruding toward the sliding plate; and a position securing groove formed in a rear surface of the sliding plate and into which the elastic protrusion is inserted, wherein as the elastic protrusion is inserted into the position securing groove, the display module may be kept in position.

The position securing groove may have a first guide surface that is inclined for the elastic protrusion to be withdrawn from the position securing groove when a predetermined force is applied to the display module.

The sliding plate may further include: a guide groove configured to guide the elastic protrusion withdrawn from the position securing groove; and a second guide surface inclined to guide movement of the elastic protrusion between the position securing groove and the guide groove.

It is another aspect of the disclosure to provide a refrigerator including: a main body forming a storage compartment; a door configured to open and close the storage compartment; a display module coupled to the door so as to be movable in upper side and lower side directions and rotatable with respect to the door; and a sliding plate disposed between the door and the display module such that the display module is coupled so as to be movable in the upper side and lower side directions and rotatable with respect to the door, the sliding plate coupled to be slidable in the upper side and lower side directions with respect to the door and allowing the display module to be rotatably coupled thereto.

The display module may include a rotation groove formed in a rear surface thereof and into which the sliding plate is inserted, wherein the rotation groove may have a diameter greater than or equal to a height of the sliding plate and smaller than or equal to a short side of the display module.

The refrigerator may further include: a mount fixed to the door and allowing the sliding plate to be slidably coupled thereto; a locking groove formed in a rear surface of the sliding plate; and a locking member inserted into the locking groove to keep the display module in position, the locking member coupled to the mount so as to be movable in a first direction with respect to the mount or a second direction opposite to the first direction.

The refrigerator may further include: an elastic member coupled to the mount and the locking member to elastically bias the locking member in the first direction; a rotation lever rotating to move the locking member in the second direction such that the locking member is withdrawn from the locking groove; and a push member provided to be movable with respect to the display module, the push member configured rotate the rotation lever by moving with respect to the display module.

It is another aspect of the disclosure to provide a refrigerator including: a main body forming a storage compartment; a display module rotatably coupled to the door and provided to be movable between a first position and a second position lower than the first position; and a lock release device configured to, when the display module is locked to be fixed at the first position, release the locking of the display module on the first position such that the display module moves to the second position by self-load of the display module.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Figure 1:
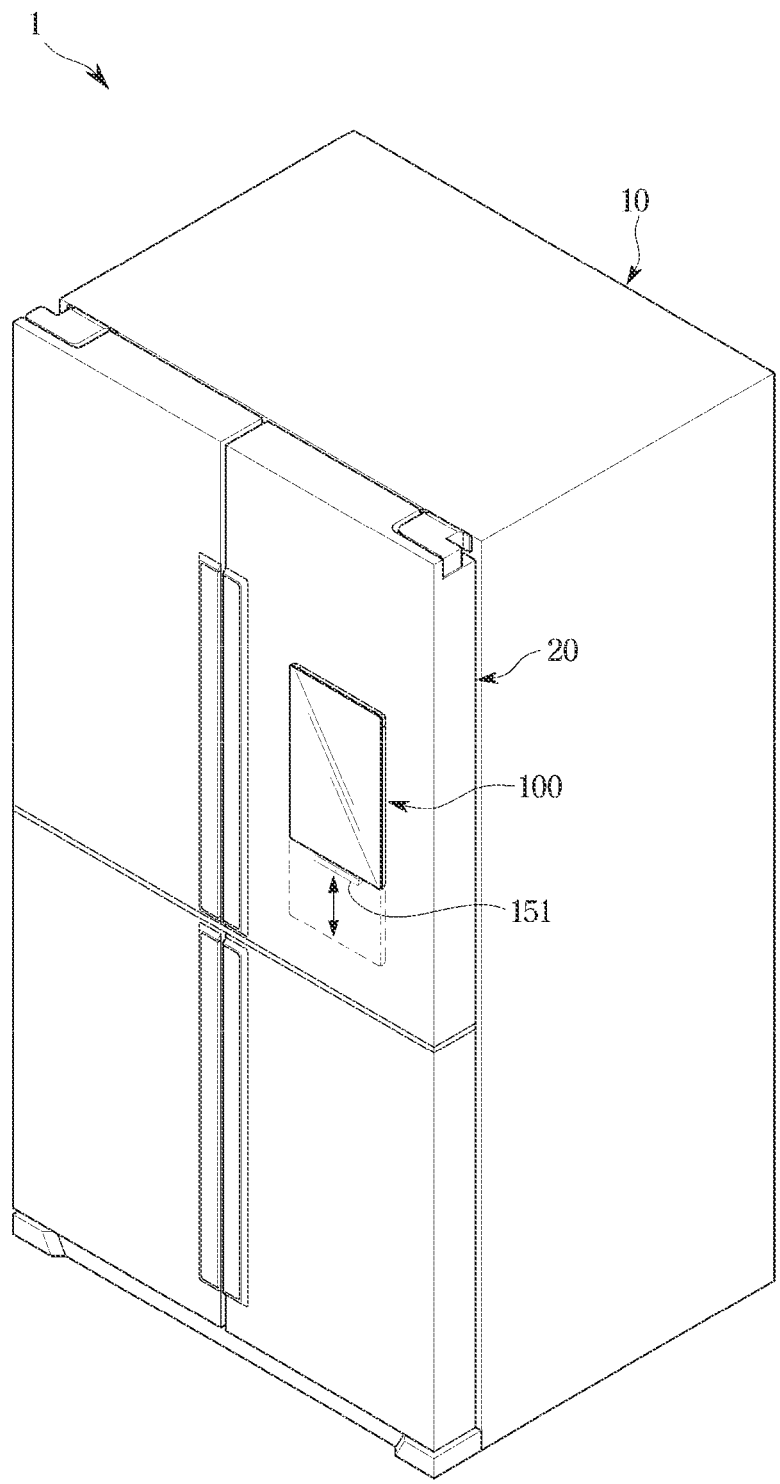
FIG. 1 is a perspective view illustrating a refrigerator according to an embodiment of the disclosure, showing a state in which a display module is arranged in a portrait mode.

FIGS. 1 through 26, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments set forth herein and illustrated in the configuration of the disclosure are only the most preferred embodiments and are not representative of the full the technical aspect of the disclosure, so it should be understood that they may be replaced with various equivalents and modifications at the time of the disclosure.

Terms used herein are used to aid in the explanation and understanding of the disclosure and are not intended to restrict and/or limit the scope and aspect of the disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

It should be understood that, although the terms "first," "second," etc. may be used herein to describe various elements, these elements are not limited by these terms. These terms are only used to distinguish one element from another. For example, a first element could be termed a second element, and, similarly, a second element could also be termed a first element, without departing from the scope of the disclosure.

The terms "front", "rear", "upper", "lower", "top", and "bottom" as herein used are defined with respect to the drawings, but the terms may not restrict the shape and position of the respective components.

Hereinafter, embodiments according to the disclosure will be described in detail with reference to the accompanying drawings. The following description will be made a refrigerator as an example of a home appliance, but the disclosure is not limited to the refrigerator. For example, the disclosure may be applied to home appliances that do not include a storage compartment and a door. In this case, the display module may be provided to be movable up and down and/or rotate with respect to a main body.

In general, refrigerators may be classified into different types according to forms of storage compartments and doors thereof.

A top mounted freezer (TMF)-type refrigerator is provided with a storage compartment that is divided into an upper side and a lower side by a horizontal partition while a freezing compartment is formed at the upper side and a refrigerating compartment is formed at the lower side, and a bottom mounted freezer (BMF)-type refrigerator is provided with a refrigerating compartment formed at the upper side while a freezing compartment is formed at the lower side.

In addition, a side by side (SBS)-type refrigerator is provided n with a storage compartment that is divided into an left side and a right side by a vertical partition while a freezing compartment is formed at one side and a refrigerating compartment is formed at the other side, and a French door refrigerator (FDR)-type refrigerator is provided therein with a storage compartment that is divided into an upper side and a lower side by a horizontal partition while a refrigerating compartment is formed at the upper side and a freezing compartment is formed at the lower side, as the refrigerating compartment at the upper side is open/closed by a pair of doors.

In addition, a 4-door refrigerator is provided with a storage compartment that is divided into an upper side and a lower side by a vertical partition while a refrigerating compartment is formed at the upper side and a freezing compartment is formed at the lower side, as the refrigerating door is opened/closed by one pair of doors and the freezing door is opened/closed by another pair of doors.

For the sake of convenience in description, a 4-door refrigerator will be described, but the disclosure is not limited thereto.

Figure 2:
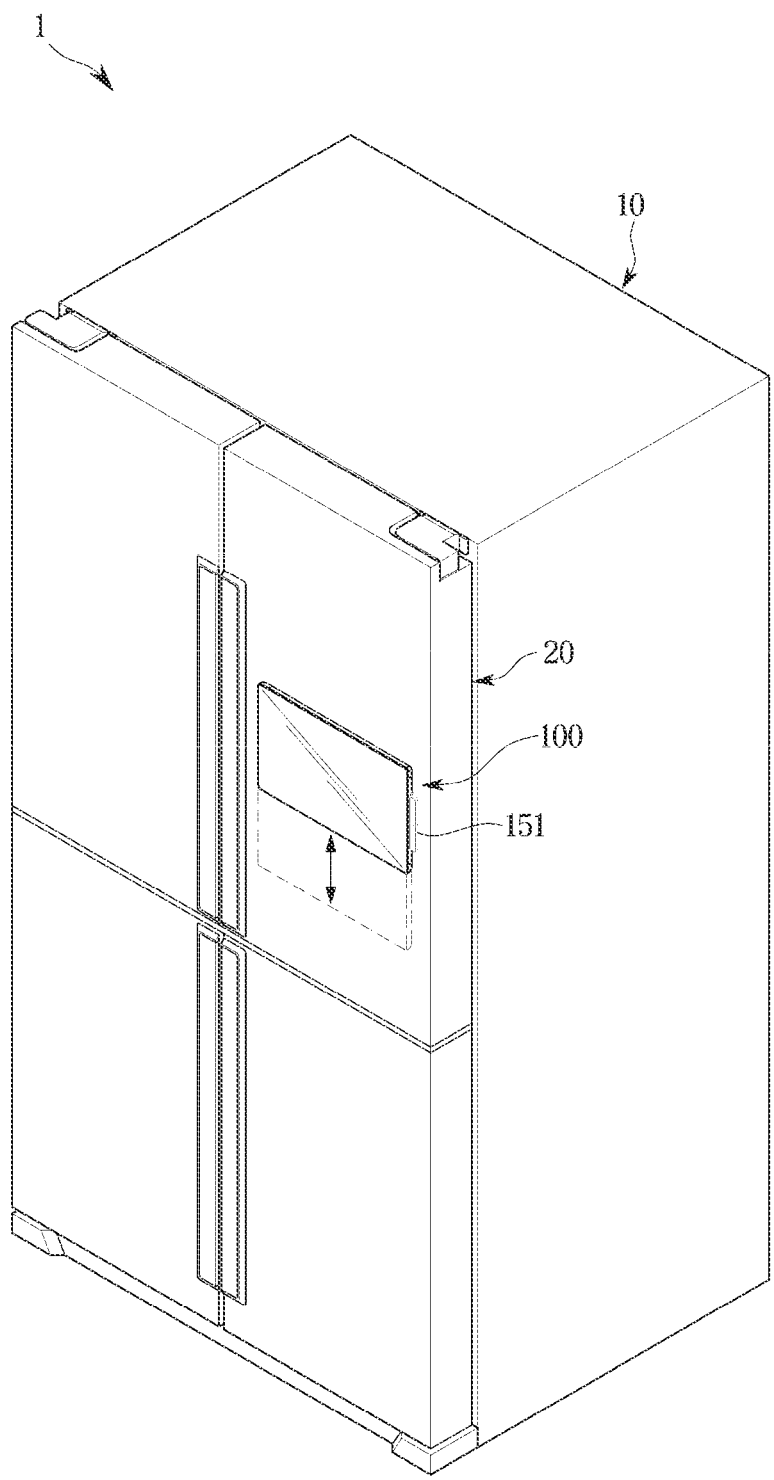
FIG. 2 is a perspective view illustrating the refrigerator according to the embodiment of the disclosure, showing a state a state in which the display module is arranged in a landscape mode.

FIG. 1 is a perspective view illustrating a refrigerator according to an embodiment of the disclosure, showing a state in which a display module is arranged in a portrait mode. FIG. 2 is a perspective view illustrating a refrigerator according to an embodiment of the disclosure, showing a state a state in which a display module is arranged in a landscape mode.

Referring to FIGS. 1 and 2, a refrigerator 1 according to an embodiment of the disclosure includes a main body 10, a storage compartment formed inside the main body 10 with a front side open, a pair of doors 20 provided to open and close the open front side of the storage compartment, and a display module 100 provided on the front side of the door 20.

According to the embodiment of the disclosure, the display module 100 may be provided on a door 20 disposed on the right side, of one pair of doors that open and close a refrigerating compartment formed on the front side of the main body 10. However, the disclosure is not limited thereto, and the display module may be provided on a door disposed on the left side or on a door that opens and closes a freezing compartment.

The display module 100 may be disposed on an outer side of the door 20. The display module 100 and the door 20 may be provided as separate components. Since the display module 100 is disposed on the outer side of the door 20, the capacity of the storage compartment may be increased as compared to a case in which the display module is embedded into the door 20. When the display module 100 is embedded into the door 20, the thickness of the door 20 increases as much as the volume of the display module 100, which causes the capacity of the storage compartment to be reduced. The refrigerator according to the aspect of the disclosure may include the display module disposed on the outer side of the door, to thereby prevent the capacity of the storage compartment from being reduced. That is, the refrigerator may secure the storage compartment capacity even while including the display module.

The display module 100 is configured to display various pieces of information and images, and configured to receive a touch input from a user. In the display module 100, a display 105 (see FIG. 3) for displaying a screen is provided in a substantially quadrangular shape.

According to the aspect of the disclosure, the display module 100 may be provided to be movable up and down and to be rotatable with respect to the door 20.

Referring to FIG. 1, the display module 100 may have long sides arranged perpendicular to the ground. In the following description, such an arrangement of the display module 100 is referred to as a portrait mode. The display module 100 may be fixed at a first position. The first position is a position higher than a second position, which will be described below, and may be set to a position convenient for use by most adults. As shown in FIG. 1, the display module 100 may be provided to be movable from the first position to the second position or from the second position to the first position while in a portrait mode.

Referring to FIG. 2, the display module 100 may have the long sides arranged parallel to the ground. Hereinafter, the arrangement of the display module 100 is referred to as a landscape mode. Referring to FIGS. 1 and 2, the display module 100 may be arranged in a portrait mode or a landscape mode.

When rotating the display module 100 to set from the landscape mode to the portrait mode or from the portrait mode to the landscape mode, the user may rotate the display module 100 without any action, such as pressing a button.

The display module 100 may be fixed at the second position. The second position is a position lower than the first position, and set to a position convenient for use by children, or adults in a sitting state. The display module 100 may be arranged in a portrait mode or a landscape mode in the second position.

The display module 100 may include a push member 151 provided to be movable into the display module 100. The user may move the display module 100 from the first position to the second position by pushing the push member 151.

When the push member 151 is pushed, fixing of the display module 100 onto the first position may be released. When the fixing of the display module 100 onto the first position is released, the display module 100 may move downward by the self-load. The display module 100 moving downward may stop at the second position. The display module 100 may be fixed at the second position by the self-load. The second position may indicate the lowest position of the display module 100 within a movable range of the display module 100.

When moving the display module 100 from the second position to the first position, the user may not push the push member 151. In other words, without pushing the push member 151, the display module 100 may be moved from the second position to the first position, and fixed at the first position. The description thereof will be described below in detail.

Referring to FIGS. 1 and 2, even when the display module 100 moves up and down or rotates, any component connecting the display module 100 to the door 20 is not exposed on the outer surface of the door 20. The refrigerator according to the aspect of the disclosure includes a connecting device that couples the display module 100 to the door 20, but the connecting device is configured not to be exposed to the outside of the door 20. Accordingly, the refrigerator according to the aspect of the disclosure may have a simple design without components exposed to the outside of the door when the display module rotates or moves up and down.

Figure 3:
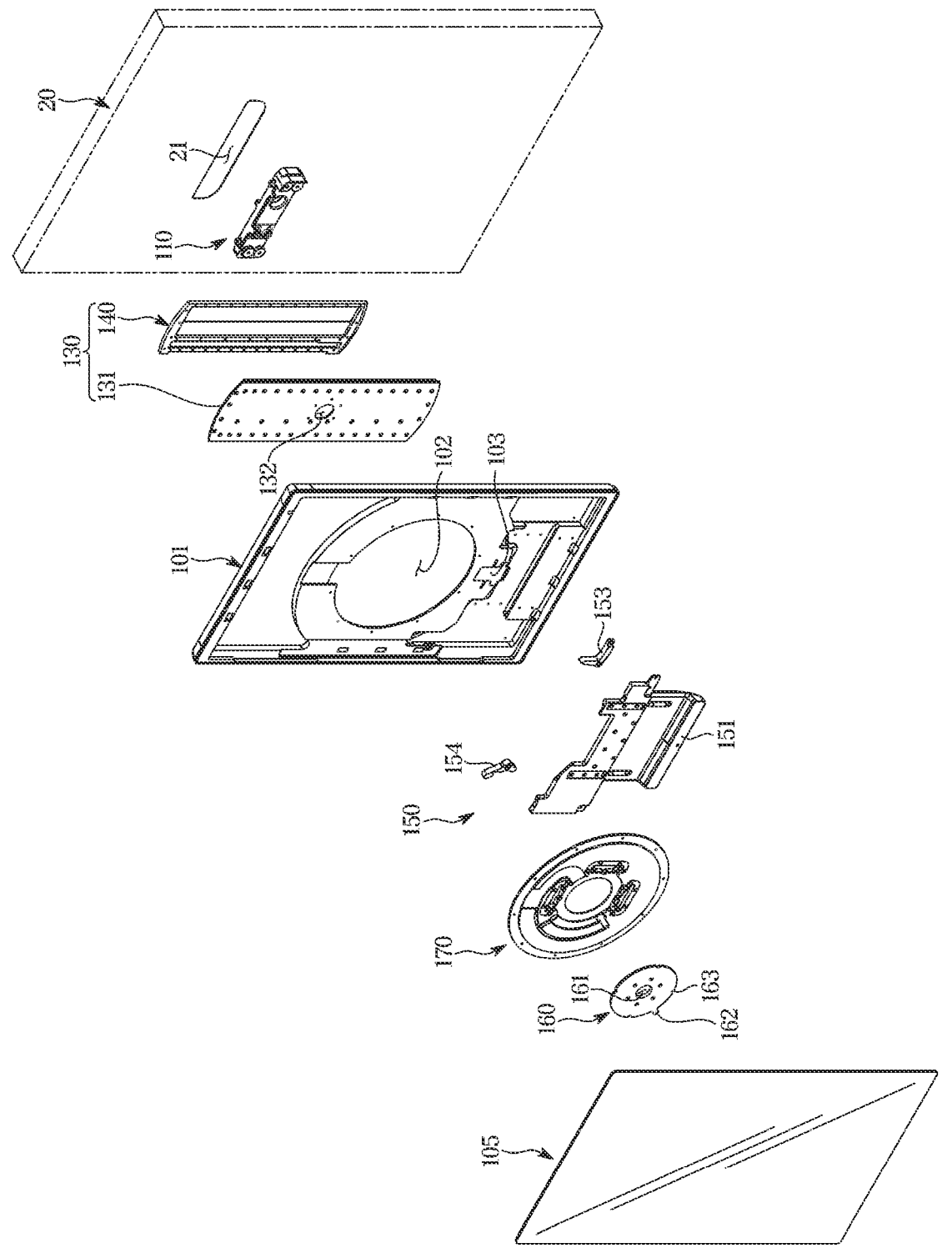
FIG. 3 is an exploded perspective view illustrating the refrigerator according to the embodiment of the disclosure, showing a state in which the display module and the connection device are disassembled.

FIG. 3 is an exploded perspective view illustrating the refrigerator according to the embodiment of the disclosure, which shows a state in which a display module and a connection device are disassembled.

According to the aspect of the disclosure, the display module 100 may include connecting device 110, 130, 160, and 170 for connecting the display module 100 to the door 20 so that the display module 100 is coupled so as to be movable up and down and rotatable with respect to the door 20. For the sake of convenience in description, the display module 100 is illustrated as including parts of the connecting devices 110, 130, 160, and 170.

Referring to FIG. 3, the door 20 may include a door hole 21. The door hole 21 may be provided to be covered by the display module 100. The door hole 21 is covered by the display module 100 without being exposed on the outside of the door 20.

The refrigerator 1 includes the mount 110 inserted into and fixed to the door hole 21, the sliding plate 130 slidably coupled to the mount 110, and a display housing 101 coupled to the sliding plate 130 so as to be slidable together with the sliding plate 130. The sliding plate 130 may include a rail plate 131 including a rail to be described below, and a rack plate 140 including a rack to be described below. Unlike that shown in the drawing, the rail plate 131 and the rack plate 140 may be integrally formed with each other.

In addition, the display module 100 may include the rotating plate 170 configured to correspond to a housing hole 102 of the display housing 101, the fixed plate 160 disposed inside the display housing 101 and fixedly coupled to the sliding plate 130, and a display 105 configured to display an image and configured to receive a touch input from a user.

In addition, the display module 100 may further include a lock release device 150 that releases the locking of the display module 100 on the first position.

Figure 4:
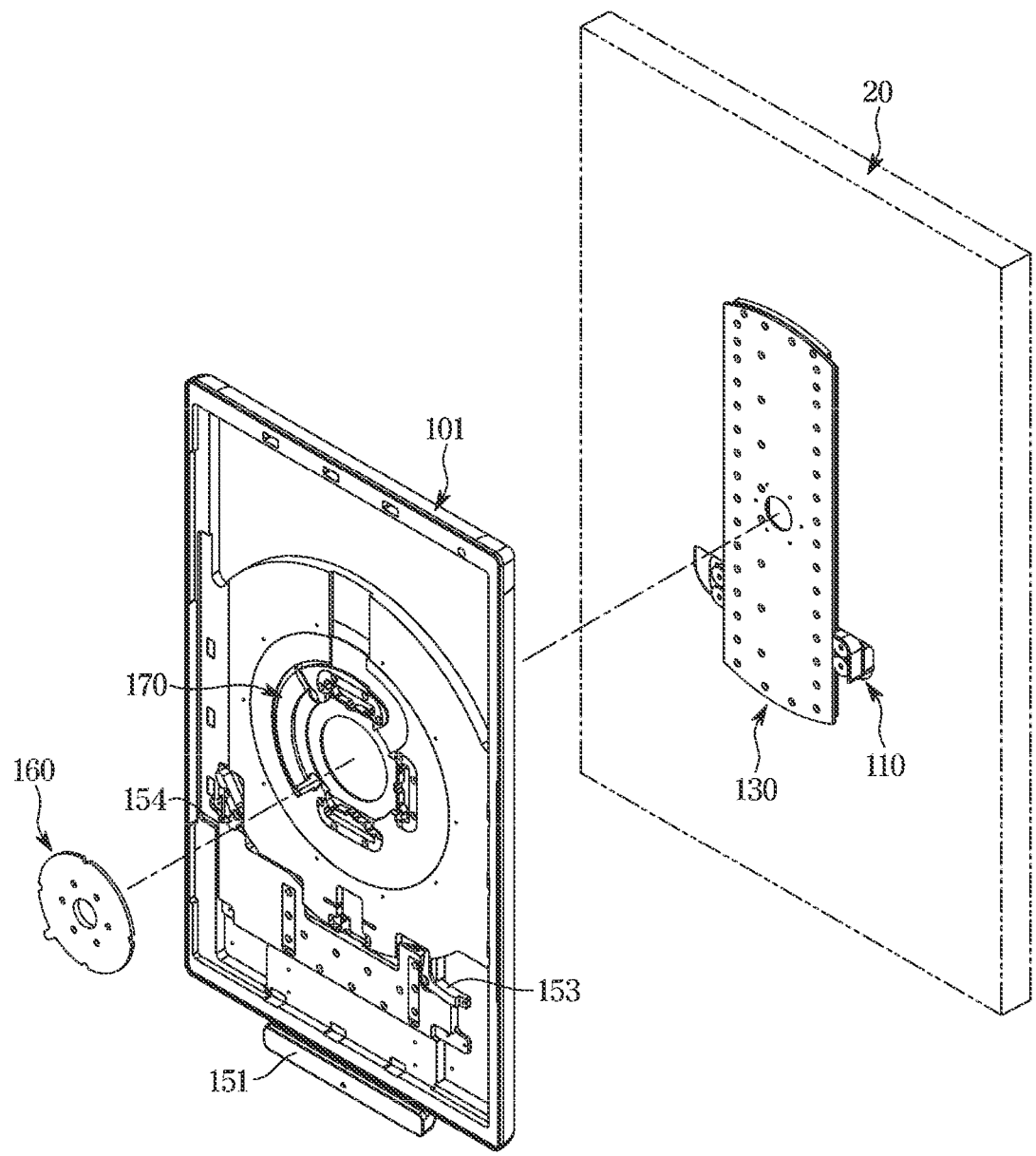
FIG. 4 is a view illustrating the refrigerator according to the embodiment of the disclosure, showing a coupling relationship between the display module and the connection device.
Figure 5:
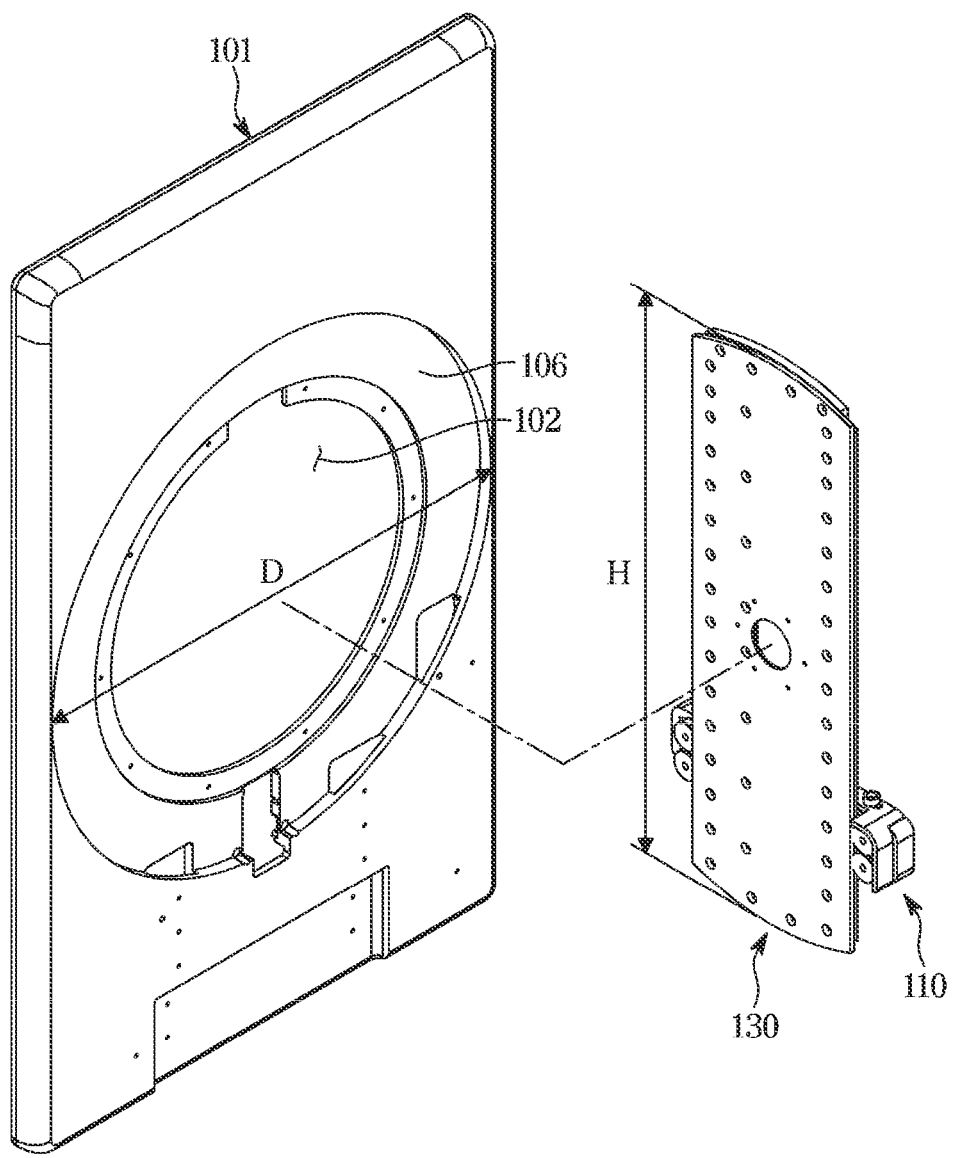
FIG. 5 is a view illustrating the refrigerator according to the embodiment of the disclosure, showing a coupling relationship between a display housing and a sliding plate.

FIG. 4 is a view illustrating the refrigerator according to the embodiment of the disclosure, showing a coupling relationship between the display module and the connection device. FIG. 5 is a view illustrating the refrigerator according to the embodiment of the disclosure, showing a coupling relationship between the display housing and the sliding plate.

Referring to FIG. 4, the sliding plate 130 may be slidably coupled to the mount 110 fixedly coupled to the door 20. The mount 110 may be kept fixed, and allow the sliding plate 130 to be slidable in the upper side and lower side directions with respect to the mount 110.

The sliding plate 130 may be coupled to the fixed plate 160. The sliding plate 130 may be coupled to the fixed plate 160 with the display housing 101 and the rotating plate 170 interposed between the sliding plate 130 and the fixed plate 160. As the fixed plate 160 is coupled to the sliding plate 130, the rotating plate 170 disposed therebetween may be rotatably coupled to each of the fixed plate 160 and the sliding plate 130. The rotating plate 170 may be rotatably coupled to the fixed plate 160, and may be rotatably coupled to the sliding plate 130. The fixed plate 160 may be coupled so as not to rotate relative to the sliding plate 130.

Referring to FIG. 5, the display housing 101 may be provided in a rear surface thereof with a rotation groove 106 into which the sliding plate 130 is inserted. A housing hole 102 may be formed in the center of the rotation groove 106.

The rotation groove 106 may be formed by recessing a portion of the rear surface of the display housing 101. The rotation groove 106 may be formed in the shape of a circle. Therefore, the rotation groove 106 may have a diameter D.

The sliding plate 130 may have a height H. The height H of the sliding plate 130 may indicate the length of the longest side of the sliding plate 130.

The height H of the sliding plate 130 may be smaller than or equal to the diameter D of the rotation groove 106. Since the diameter D of the rotation groove 106 is formed larger than the height H of the sliding plate 130, the sliding plate 130 being inserted into the rotation groove 106 may rotate within the rotation groove 106. As the sliding plate 130 is inserted into the rotation groove 106, the display housing 101 may not be spaced apart from the sliding plate 130 in the upper and lower side direction or the left and right side direction. As the sliding plate 130 is inserted into the rotation groove 106, the display housing 101 may not move relative to the sliding plate 130 in the upper side and lower side direction or in the left and right side direction. Alternatively, the display housing may include a circular rib protruding from the rear surface of the display housing toward the sliding plate, and the sliding plate may be inserted into the rib.

Upper and lower surfaces of the sliding plate 130 may be formed as curved surfaces, respectively. Preferably, the upper and lower surfaces of the sliding plate 130 may be provided in an arc shape of a circle having the same diameter as the diameter of the rotation groove 106. With such a configuration, the sliding plate 130 may rotate smoothly in the rotation groove 106 without a gap.

In addition, since the diameter D of the rotation groove 106 formed in the rear surface of the display housing 101 is greater than or equal to the height H of the sliding plate 130, when the sliding plate 130 inserted into the rotation groove 106 rotates, the sliding plate 130 may not protrude outside of the display housing 101. That is, even when the sliding plate 130 rotates within the rotation groove 106, the sliding plate 130 may not protrude outside of the display module 100 when viewed from the front of the display module 100.

When the height H of the sliding plate 130 is excessively small, since the distance that the sliding plate 130 is slidable with respect to the mount 110 becomes small, the range of movement in the upper side and lower side direction of the display module 100 is restricted. As the range of movement in the upper side and lower side direction of the display module 100 is excessively small, the effectiveness of the sliding plate 130 is lowered. Accordingly, the height H of the sliding plate 130 may be set large enough to secure the effectiveness.

The length of the short side of the display module 100 may be greater than or equal to the diameter D of the rotation groove 106. When the diameter D of the rotation groove 106 is excessively large, the length of the short side of the display module 100 is subject to increase in proportion to the large diameter D of the rotation groove 106. When the length of the short side of the display module 100 is excessively large, the length of the short side has no difference from the length of the long side of the display module 100. In this case, the length of the long side and the length of the short side of the display module 100 may become equal to each other, providing a square. When the display module 100 is provided in a square shape, the reason of rotating the display module 100 is lost. In addition, when the display module 100 is provided in a square shape, the display module 10 has a difficulty in effectively reproducing both a vertical image and a horizontal image.

Therefore, it is preferable that the diameter D of the rotation groove 106 is small.

Figure 6:
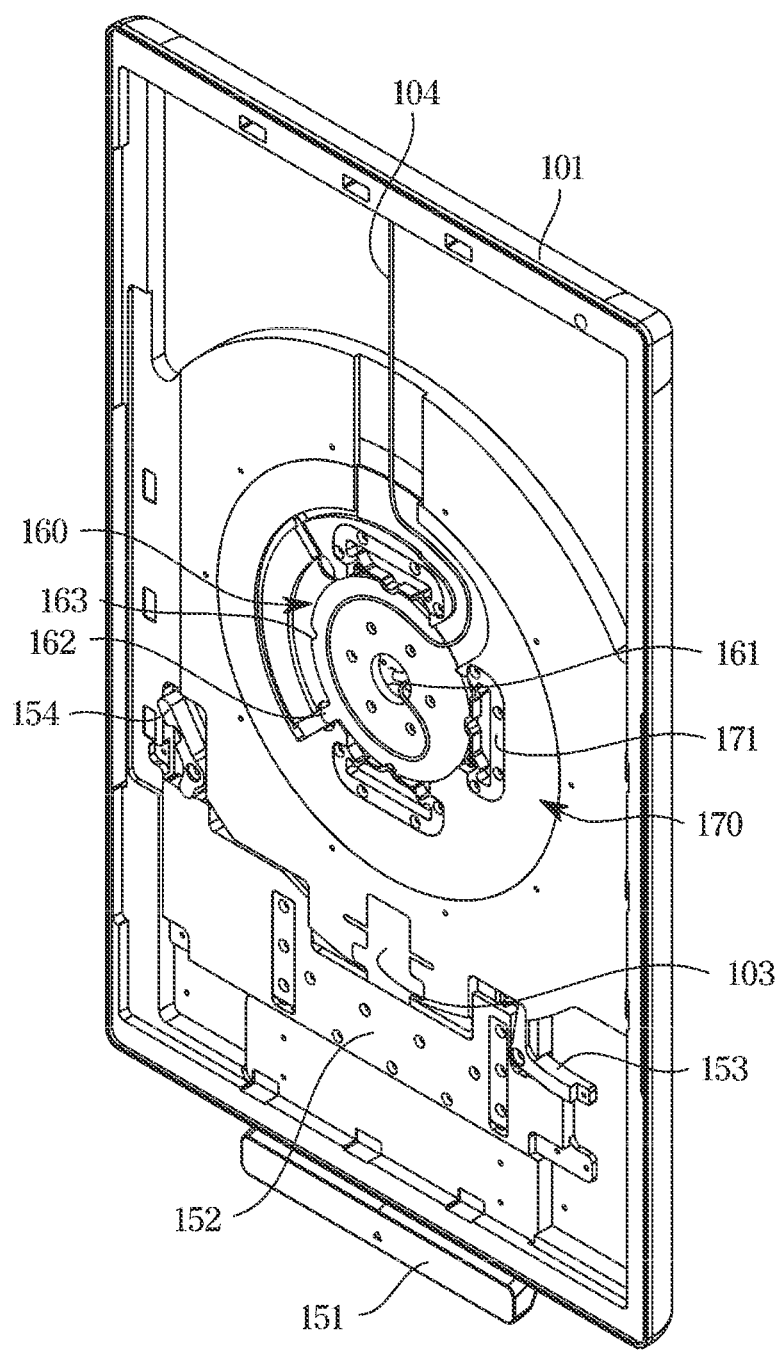
FIG. 6 is a perspective view illustrating the refrigerator according to the embodiment of the disclosure, showing an internal structure of the display module.

FIG. 6 is a perspective view illustrating the refrigerator according to the embodiment of the disclosure, showing an internal structure of the display module 100 except for the display 105.

Referring to FIG. 6, the display module 100 may include a wire 104 provided to electrically connect electrical components inside the main body 10 to the display 105. The wire 104 from the inside of the main body 10 may sequentially pass through the door hole 21, a mount hole 111 of the mount 110, a first wire hole (132 in FIG. 3) formed in the center of the sliding plate 130, the housing hole 102, a second wire hole formed in the center of the rotating plate 170, and a third wire hole 161 of the fixed plate 160, and finally may connect to the display 105.

The lock release device 150 may include the push member 151 provided to be pushed inward of the display housing 101. In addition, the lock release device 150 may further include a lever push portion 152 coupled to the push member 151 and provided to move together with the push member 151. The lever push portion 152 and the push member 151 may be integrally formed with each other, different from that shown in the drawings.

The lock release device 150 may further include rotation levers 153 and 154 provided to be rotatable according to movement of the lever push portion 152. The rotation levers 153 and 154 may include a first rotation lever 153 and a second rotation lever 154.

A first elastic member 103 may be provided inside the display housing 101. The first elastic member 103 provides elastic force such that the push member 151 and the lever push portion 152 are moved to the original positions when the push member 151 and the lever push portion 152 are pushed by the user. The first elastic member 103 may accumulate elastic force when the lever push portion 152 is pushed. The first elastic member 103 may move the lever push portion 152 to the original position using the accumulated elastic force.

The rotating plate 170 may be provided to be rotatable relative to the fixed plate 160. The rotating plate 170 may include a catching protrusion 171 provided to fix the fixed plate 160 at a predetermined position. The fixed plate 160 includes a catching groove 163 into which the catching protrusion 171 is inserted, and the catching grooves 163 may be formed at intervals of 90 degrees along the circumferential direction of the fixed plate 160.

The fixed plate 160 may include a stopper 162 protruding outward of the fixed plate 160. The rotating plate 170 may include a stopper groove 172 formed by recessing a portion of the rotating plate 170 to restrict the range of movement of the stopper 162.

Figure 7:
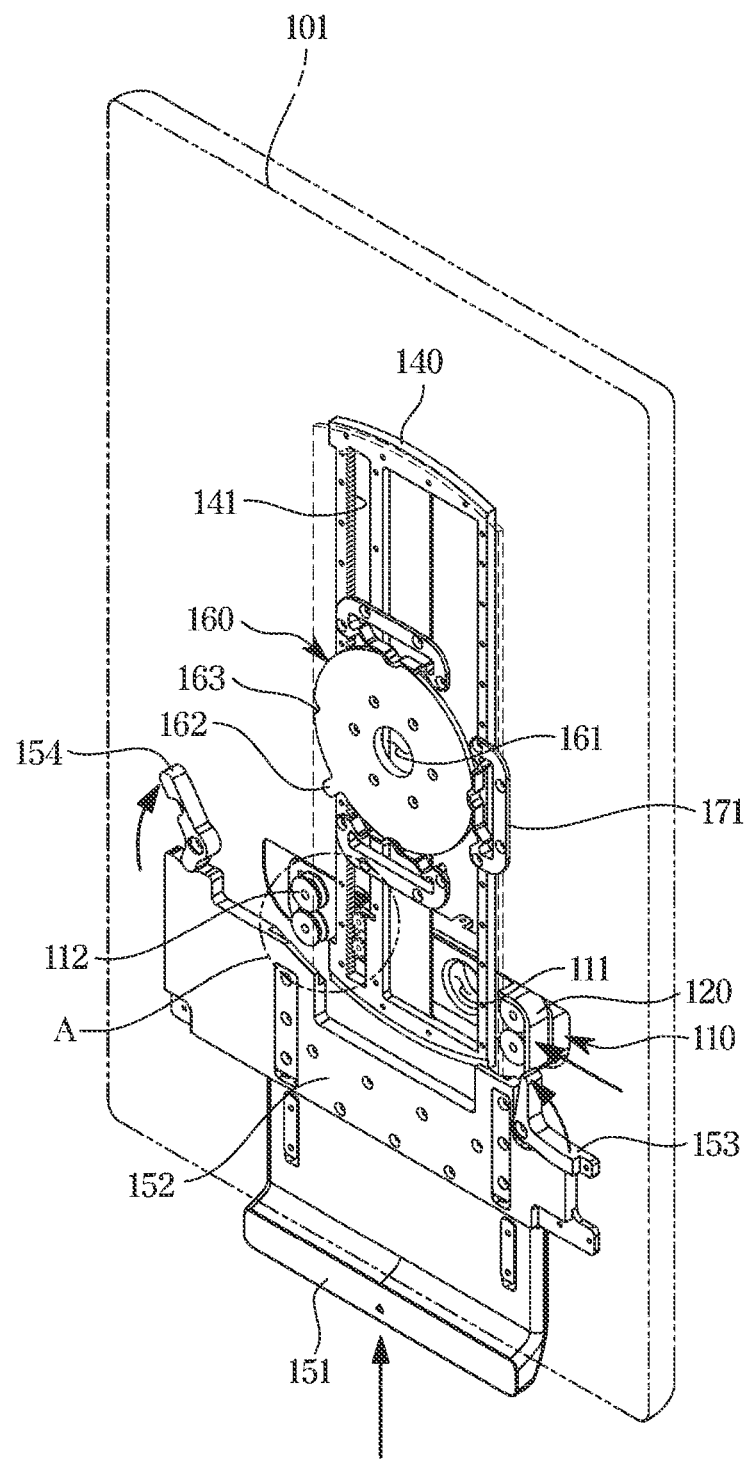
FIG. 7 is a view illustrating the refrigerator according to the embodiment of the disclosure, showing an operation of a lock release device in a portrait mode of the display module.
Figure 8:
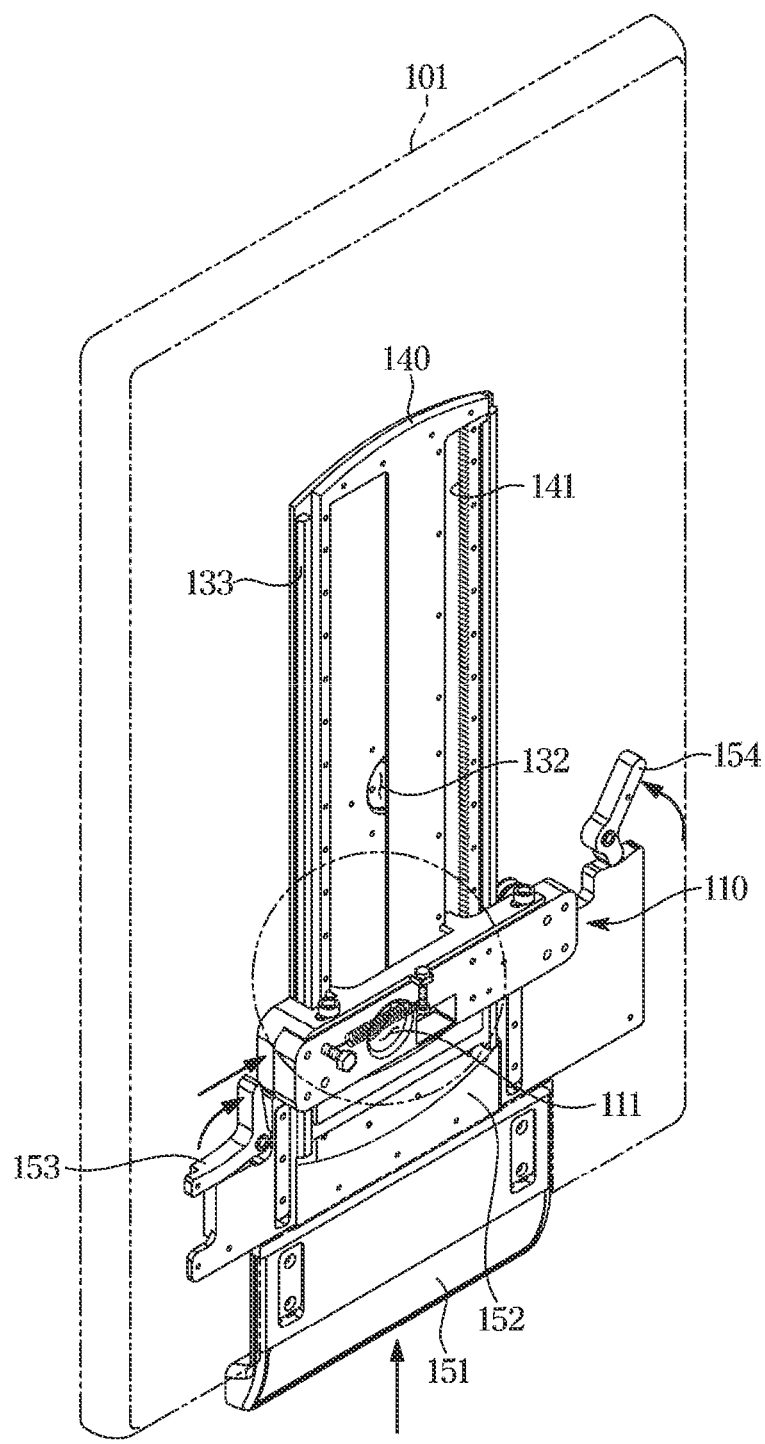
FIG. 8 is a view illustrating the display module shown in FIG. 7, when viewed from a different angle.
Figure 9:
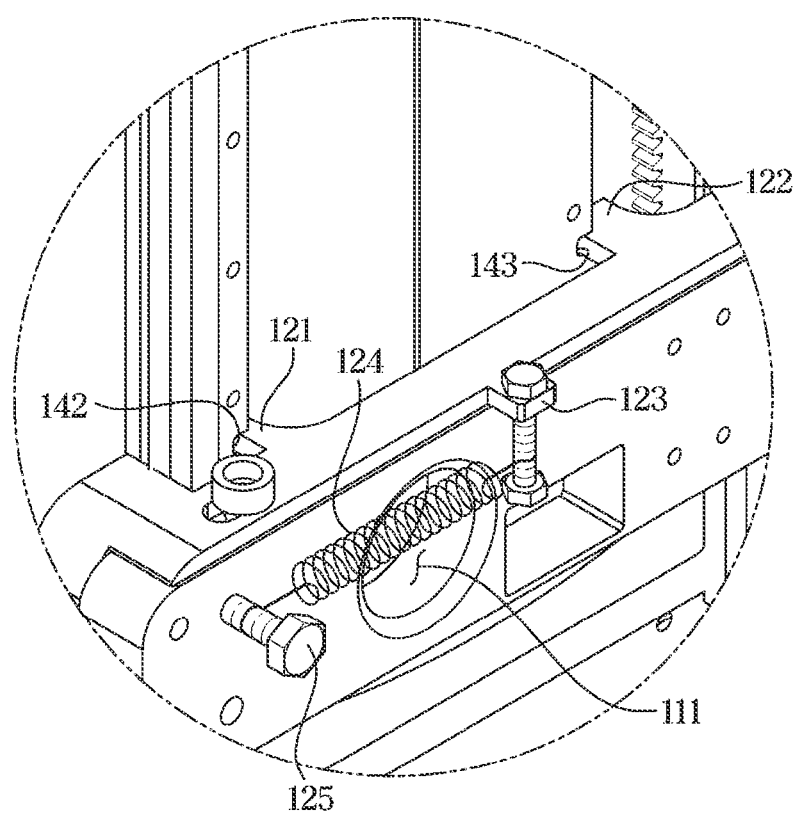
FIG. 9 is an enlarged view of a portion of FIG. 8.

FIG. 7 is a view illustrating the refrigerator according to the embodiment of the disclosure, showing an operation of the lock release device when the display module is arranged in a portrait mode. FIG. 8 is a view illustrating the display module shown in FIG. 7, when viewed from a different angle. FIG. 9 is an enlarged view of a portion of FIG. 8.

Hereinafter, the operation mechanism of the lock release device of the disclosure will be described in detail with reference to FIGS. 7 to 9.

Referring to FIGS. 7 to 9, the mount 110 may include a locking member 120 provided to be movable in a first direction with respect to the mount 110 and a second direction opposite to the first direction. The sliding plate 130 may include locking grooves 142 and 143. The locking member 120 may include locking protrusions 121 and 122 that are inserted into the locking grooves 142 and 143 by moving in the first direction. The first direction and the second direction may indicate a left direction and a right direction, respectively. More specifically, on FIG. 9, the first direction may indicate the left direction, and the second direction may indicate the right direction.

The locking protrusions 121 and 122 may include a first locking protrusion 121 and a second locking protrusion 122. The locking grooves 142 and 143 include a first locking groove 142 into which the first locking protrusion 121 is inserted and a second locking groove 143 into which the second locking protrusion 122 is inserted.

The mount 110 may include a second elastic member 124 coupled to the mount 110 and the locking member 120 to elastically bias the locking member 120 in the first direction with respect to the mount 110. One end of the second elastic member 124 is connected to a first elastic member fixing portion 123 provided on the locking member 120, and the other end of the second elastic member 124 is connected to a second elastic member fixing portion 125 provided on the mount 110. With such a structure, the locking member 120 moved in the second direction by an external force may move in the first direction by the elastic force of the second elastic member 124 when the external force is removed.

Referring to FIGS. 7 and 8, when the push member 151 moves to the upper side in the drawings, the lever push portion 152 may move to the upper side together with the push member 151. When the lever push portion 152 is moved to the upper side, the first rotation lever 153 and the second rotation lever 154 may be rotated by the lever push portion 152. In this case, the direction in which the first rotation lever 153 rotates and the direction in which the second rotation lever 154 rotates may be opposite to each other.

When the display module 100 is arranged in the portrait mode, the locking member 120 may be moved in the second direction by rotation of the first rotation lever 153. Referring to FIG. 7, when the push member 151 and the lever push portion 152 move upward, the first rotation lever 153 rotates counterclockwise, and the locking member 120 may move in the left direction. When the locking member 120 moves in the second direction as described, the locking protrusions 121 and 122 may be withdrawn from the locking grooves 142 and 143. When the locking protrusions 121 and 122 are withdrawn from the locking grooves 142 and 143, the fixing of the display module 100 onto the first position may be released.

Figure 10:
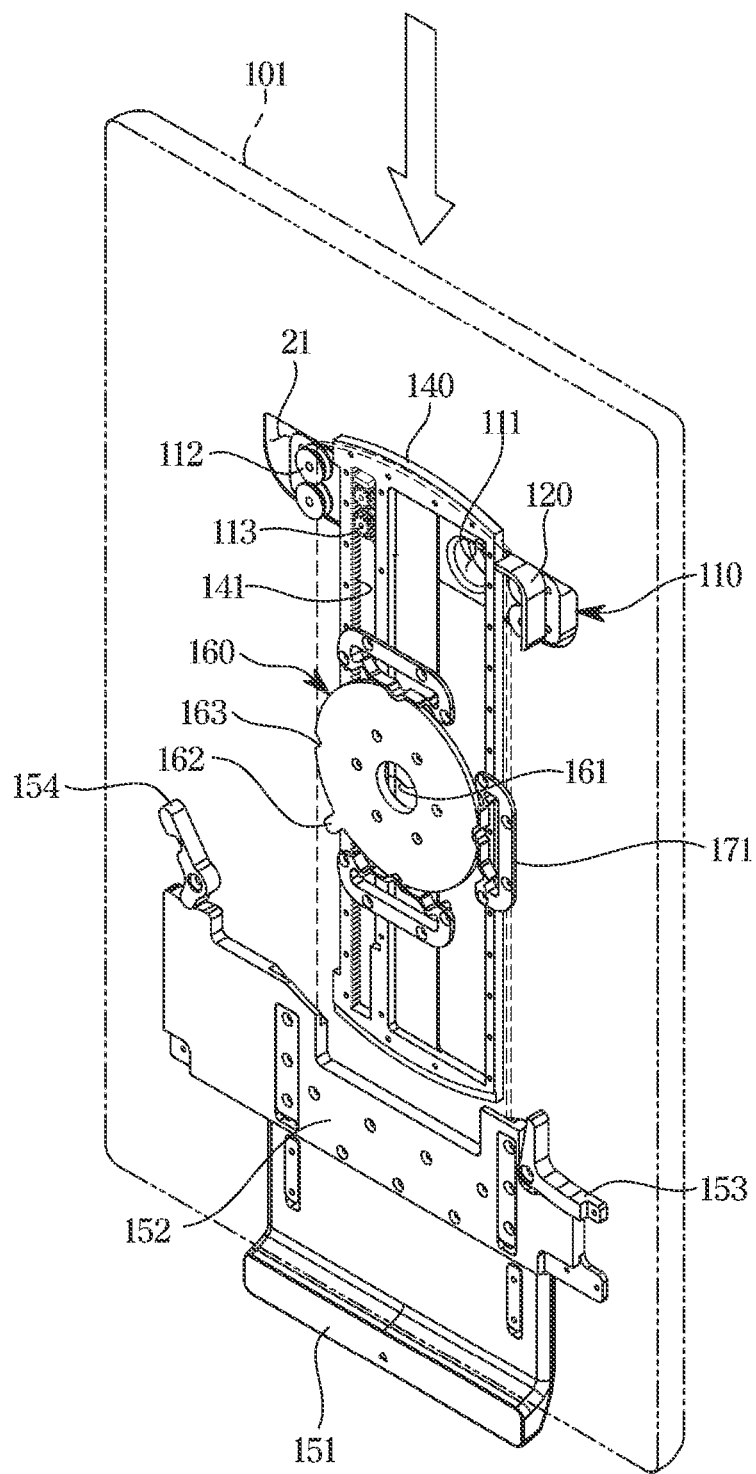
FIG. 10 is a view illustrating the refrigerator according to the embodiment of the disclosure, showing a process in which the display module arranged in a portrait mode is moved from a first position to a second position.
Figure 11:
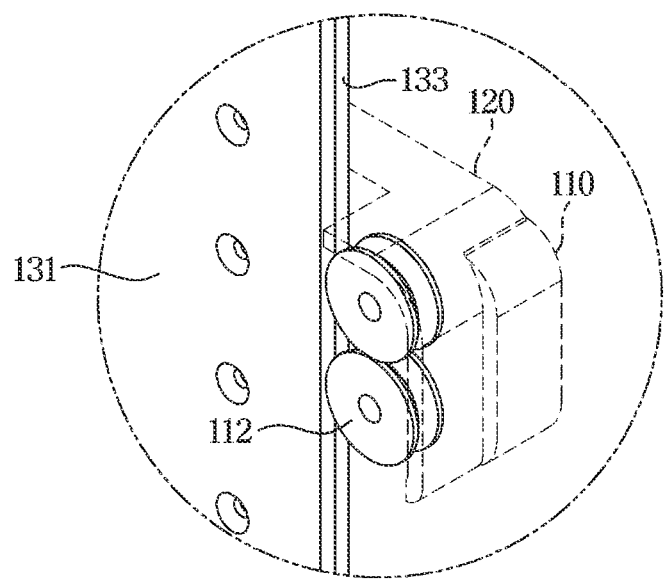
FIG. 11 is a view illustrating the refrigerator according to the embodiment of the disclosure, which separately shows a roller and a rail.
Figure 12:
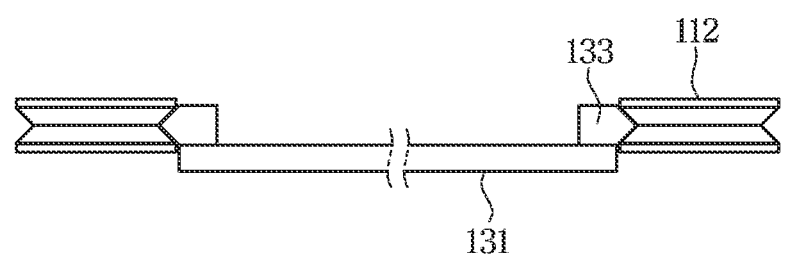
FIG. 12 is a view illustrating the roller and the rail shown in FIG. 11, when viewed from a different angle.
Figure 13:
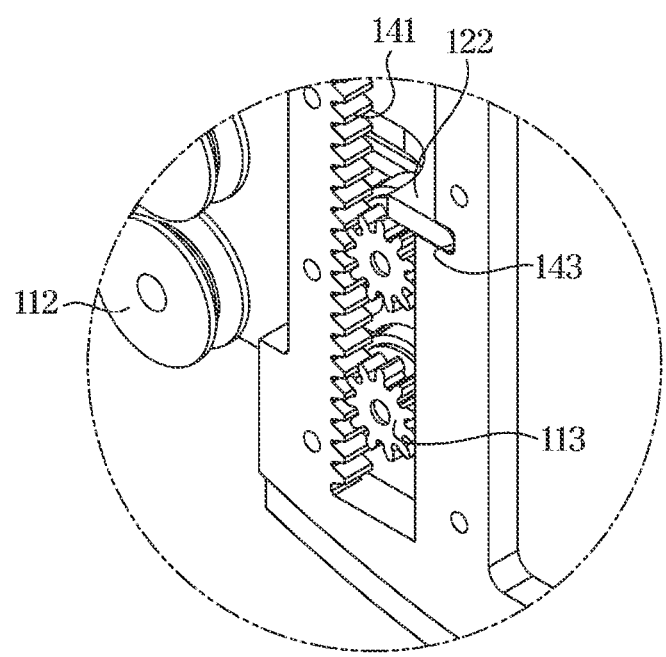
FIG. 13 is an enlarged view of part A of FIG. 7.

FIG. 10 is a view illustrating the refrigerator according to the embodiment of the disclosure, showing a process in which the display module arranged in a portrait mode is moved from the first position to the second position. FIG. 11 is a view illustrating the refrigerator according to the embodiment of the disclosure, which separately shows a roller and a rail. FIG. 12 is a view illustrating the roller and the rail shown in FIG. 11, when viewed from a different angle. FIG. 13 is an enlarged view of part A of FIG. 7.

Hereinafter, a process in which the display module 100 is fixed after being moved from the first position to the second position will be described in detail with reference to FIGS. 10 to 13.

When the locking member 120 moves in the second direction and thus the locking protrusions 121 and 122 are withdrawn from the locking grooves 142 and 143 as described above, the locking of the display module 100 on the first position may be released.

When the locking of the display module 100 is released, the display module 100 may move downward from the first position by the self-load.

Referring to FIG. 11, the sliding plate 130 may include a rail 133. Specifically, a pair of rails 133 may be provided on both sides of the rail plate 131. The mount 110 may include rollers 112 provided to mate with the rails 133 and rotate relative to the rails 133. According to the embodiment of the disclosure, the rollers 112 may be provided as four rollers, but the number of the roller 112 is not limited thereto.

Referring to FIG. 12, the rail 133 may include a V rail, and the roller 112 may include a V roller. By including the V rail and the V roller, the mount 110 and the sliding plate 130 may reduce a gap in the left-right direction and a gap in the front-rear direction. With such a configuration, the display module 100 may be stably coupled to the door 20.

Referring to FIG. 13, the sliding plate 130 may include a rack 141. The mount 110 may include a rotating damper 113 having a rotating axis provided in parallel with a rotating axis of the roller 112. The rack 141 may be provided on the rack plate 140 and may extend in the upper side and lower side direction. The rotating damper 113 may have a pinion meshed with the rack 141, and provided to adjust the sliding speed of the sliding plate 130. The rotating damper 113 may prevent the sliding plate 130 from sliding with respect to the mount 110 at an excessively high speed. The rotating damper 113 may prevent the display module 100 from being damaged due to moving at a high speed and suddenly stopping at the second position.

Since the rotating damper 113 adjusts the moving speed of the display module 100, the user may not need to directly move the display module 100 from the first position to the second position. The display module 100 may move from the first position to the second position by the self-load at an appropriate speed.

Figure 14:
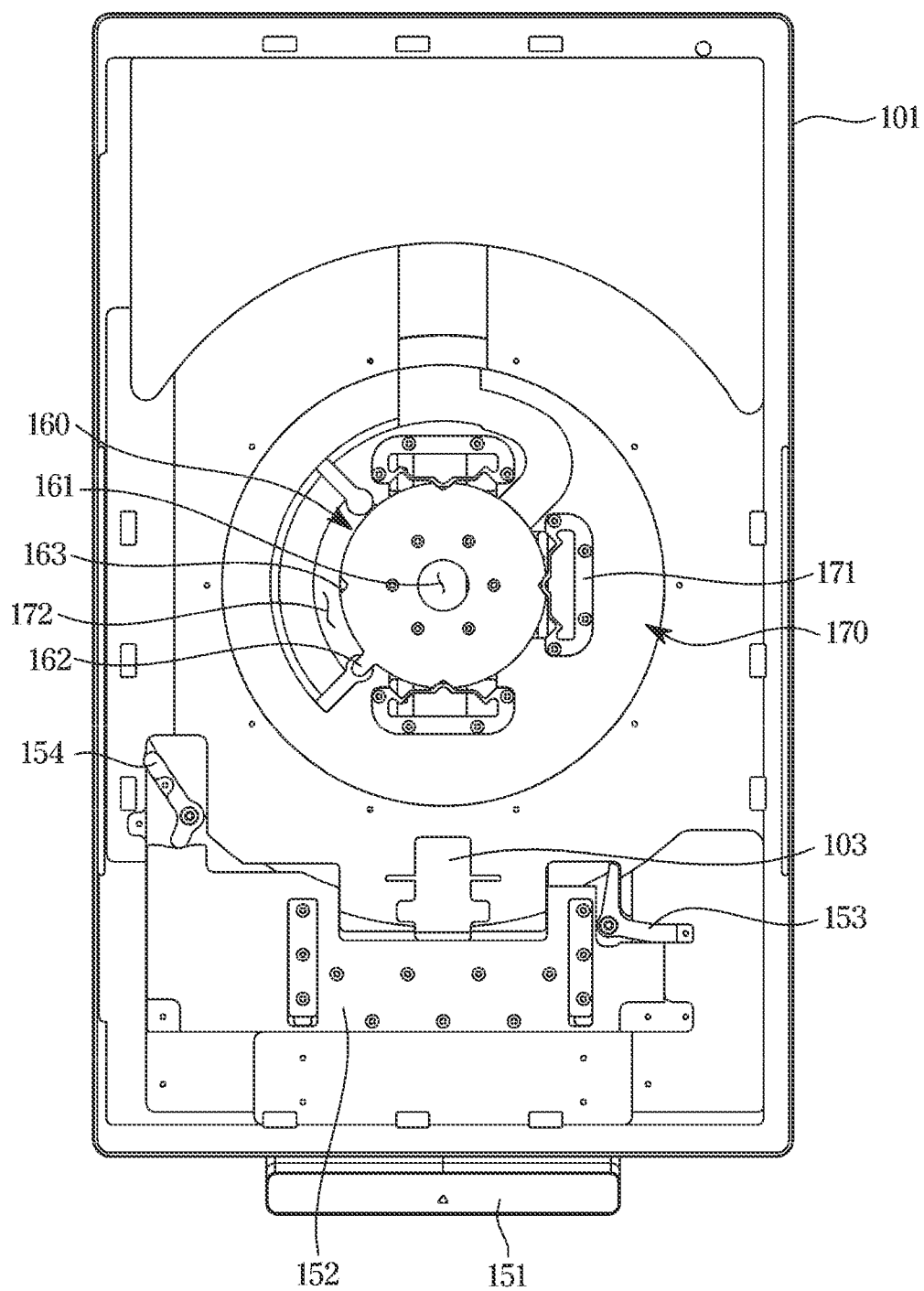
FIG. 14 is a front view illustrating the refrigerator according to the embodiment of the disclosure, showing an internal structure of the display module in a portrait mode of the display module.
Figure 15:
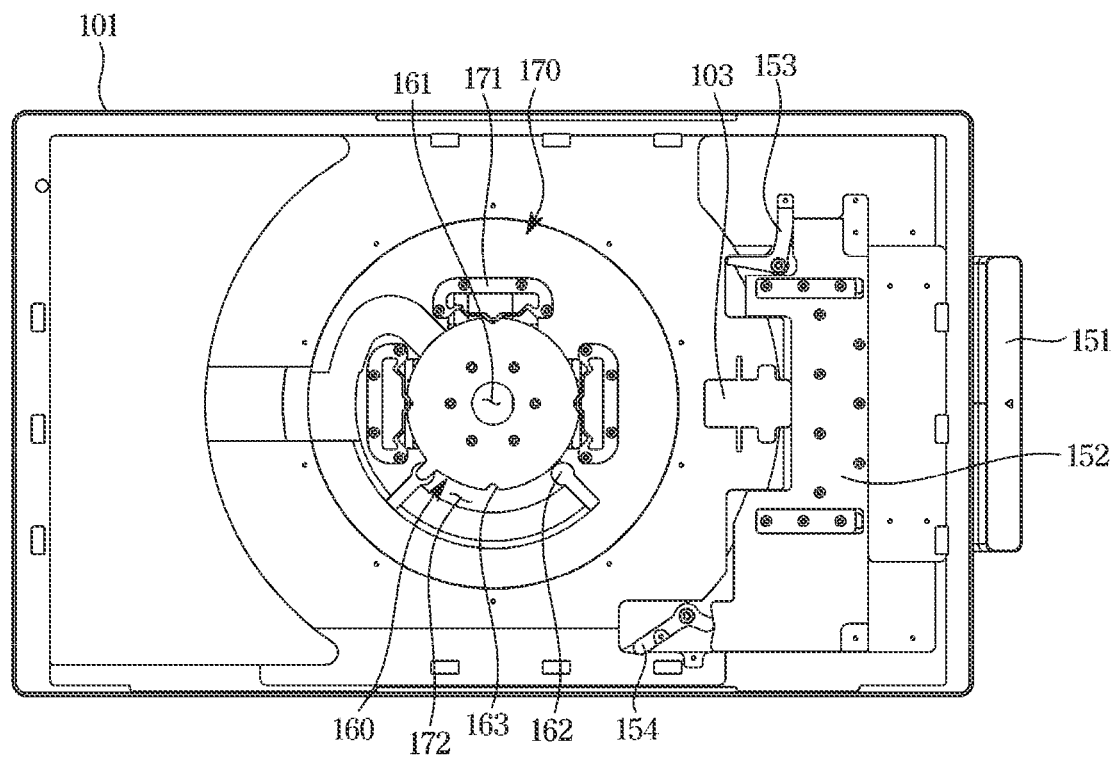
FIG. 15 is a front view illustrating the refrigerator according to the embodiment of the disclosure, showing an internal structure of the display module in a landscape mode of the display module.

FIG. 14 is a front view illustrating the refrigerator according to the embodiment of the disclosure, showing an internal structure of the display module when the display module is disposed in a portrait mode. FIG. 15 is a front view illustrating the refrigerator according to the embodiment of the disclosure, showing an internal structure of the display module when the display module is disposed in a landscape mode.

Hereinafter, the rotation operation of the display module according to the embodiment of the disclosure will be described in detail with reference to FIGS. 14 and 15.

The rotating plate 170 may be provided to rotate together with the display housing 101. The rotating plate 170 may be disposed between the fixed plate 160 and the sliding plate 130. The rotating plate 170 may be provided to rotate relative to each of the fixed plate 160 and the sliding plate 130.

The rotating plate 170 may include the catching protrusion 171 provided to come into contact with the outer circumferential surface of the fixed plate 160. The catching protrusions 171 may be provided to be inserted into the catching grooves 163 formed to be spaced apart from each other along the circumferential direction of the fixed plate 160, and may include a material having elasticity. Accordingly, when the display module 100 rotates, the catching protrusion 171 may be elastically deformed to thereby be withdrawn from the catching groove 163 or be inserted into the catching groove 163. As the catching protrusion 171 is inserted into the catching groove 163, the display module 100 may be fixed in a landscape mode or in a portrait mode. In order to withdraw the catching protrusions 171 from the catching groove 163, a force greater than the elastic force of the catching protrusion 171 can be used.

Accordingly, the display module 100 may be kept fixed in a landscape mode or a portrait mode unless a force greater than the elastic force of the catching protrusions 171 is applied to the display module 100.

The fixed plate 160 may include the stopper 162 protruding radially outward of the fixed plate 160. The rotating plate 170 may include a stopper groove 172 provided to restrict the range of movement of the stopper 162. The stopper 162 may move within the range of the stopper groove 172. According to the embodiment of the disclosure, the stopper groove 172 may be formed in a range of approximately 90 degrees. That is, the stopper 162 may be provided to be movable within a range of approximately 90 degrees. According to the embodiment of the disclosure, the rotation direction of the display module 100 may be provided such that the display module 100 rotates in the counterclockwise direction during rotation from the portrait mode to the landscape mode.

Figure 16:
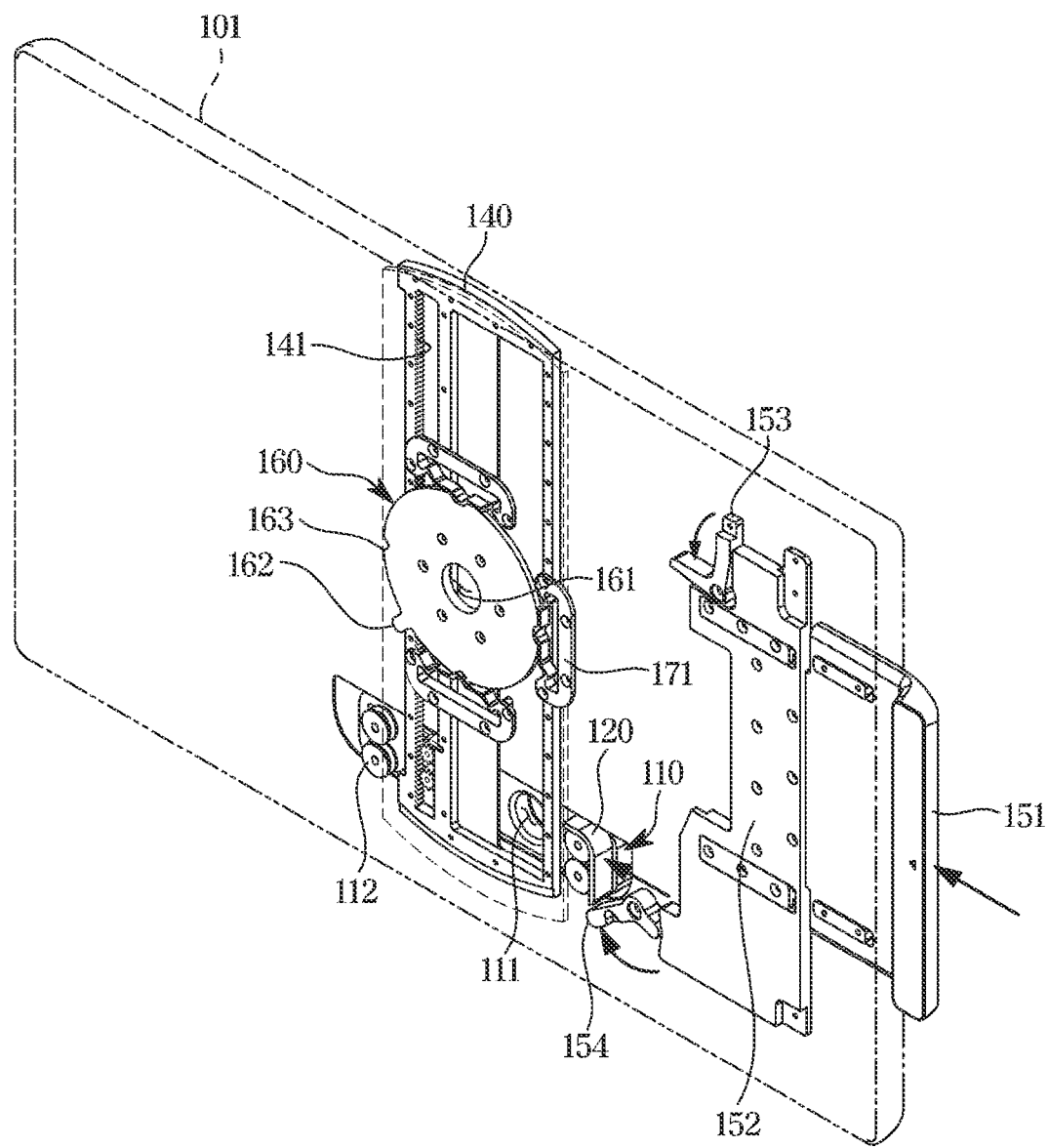
FIG. 16 is a view illustrating the refrigerator according to the embodiment of the disclosure, showing an operation of the lock release device in a landscape mode of the display module.
Figure 17:
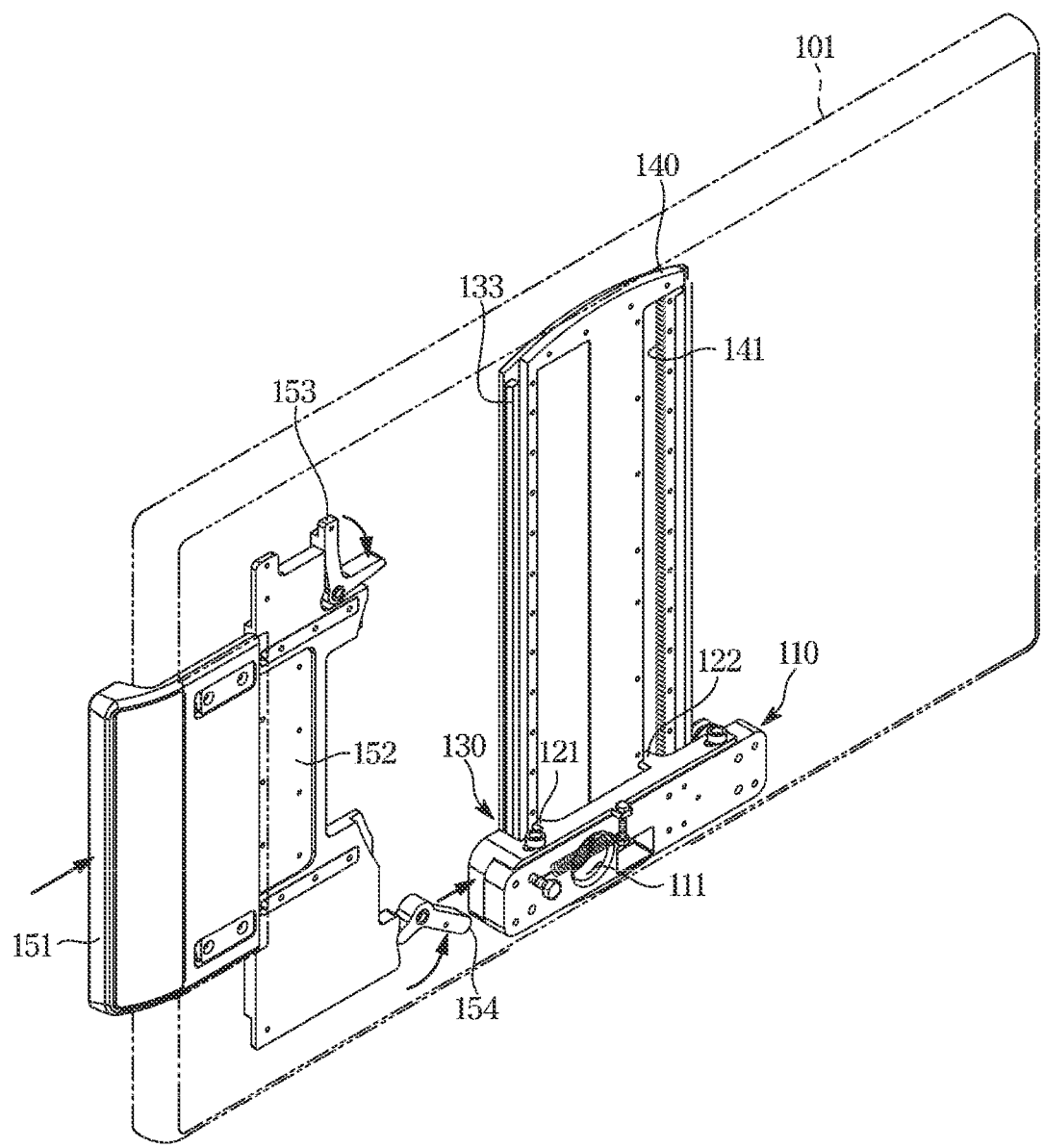
FIG. 17 is a view illustrating the display module shown in FIG. 16, when viewed from a different angle.
Figure 18:
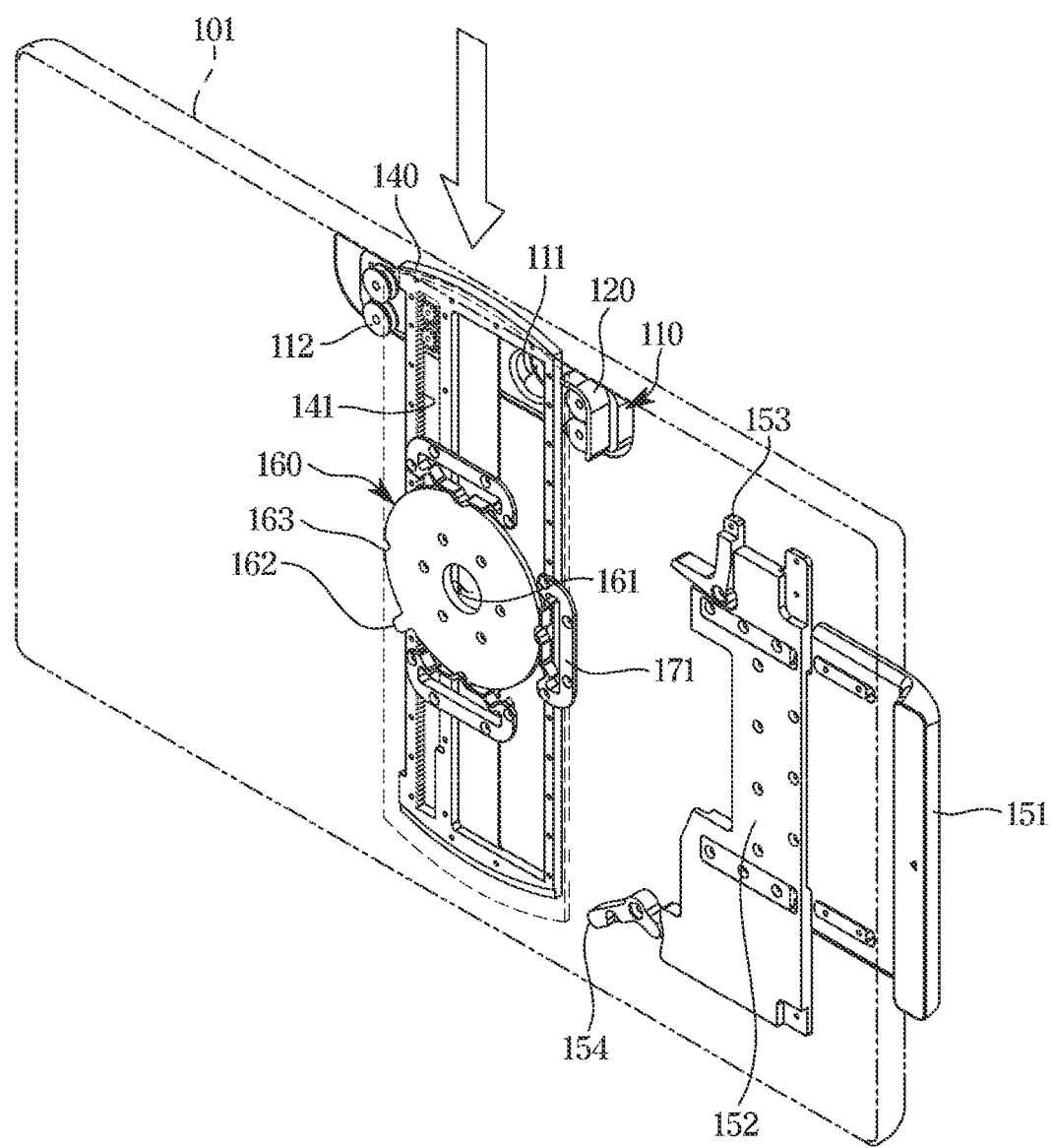
FIG. 18 is a view illustrating the refrigerator according to the embodiment of the disclosure, showing a process in which the display module arranged in a landscape mode is moved from the first position to the second position.

FIG. 16 is a view illustrating the refrigerator according to the embodiment of the disclosure, showing an operation of the lock release device when the display module is disposed in the landscape mode. FIG. 17 is a view illustrating the display module shown in FIG. 16, when viewed from a different angle. FIG. 18 is a view illustrating the refrigerator according to the embodiment of the disclosure, showing a process in which the display module arranged in a landscape mode is moved from the first position to the second position.

Hereinafter, an operation mechanism of the lock release device 150 in the landscape mode of the display module 100 will be described in detail with reference to FIGS. 16 and 17.

Referring to FIGS. 16 and 17, when the display module 100 is arranged in the landscape mode, the user may push the push member 151 to the left side on the drawing. When the push member 151 is pushed, the lever push portion 152 may move together with the push member 151. When the lever push portion 152 moves to the left side, the first rotation lever 153 and the second rotation lever 154 may individually rotate. As described above, the direction in which the first rotation lever 153 rotates may be opposite to the direction in which the second rotation lever 154 rotates.

When the display module 100 is arranged in the landscape mode, the second rotation lever 154 may move the locking member 120 in the second direction. As described above, when the locking member 120 is moved in the second direction, the locking protrusions 121 and 122 may be withdrawn from the locking grooves 142 and 143. When the locking protrusions 121 and 122 are withdrawn from the locking grooves 142 and 143, the locking of the display module 100 on the first position may be released. That is, the first rotation lever 153 and the second rotation lever 154 may be provided to selectively move the locking member 120 according to the arrangement of the display module 100. The first rotation lever 153 and the second rotation lever 154 may be provided to be simultaneously rotated regardless of the arrangement of the display module 100.

However, according to the aspect of the disclosure, the rotation lever may include one of the first rotation lever 153 and the second rotation lever 154. The display module 100 may be provided not to be rotatable with respect to the door. The display module 100 may be provided to be movable up and down but fixed in a landscape mode or fixed in a portrait mode. When the refrigerator includes the display module fixed in a portrait mode, the rotation lever may include the first rotation lever 153 and not include the second rotation lever 154. In addition, when the refrigerator includes the display module fixed in the landscape mode, the rotation lever may include the second rotation lever 154 and not include the first rotation lever 153.

Referring to FIG. 18, when the locking of the display module 100 on the first position is released, the display module 100 may move downward by the self-load. As described above, the display module 100 may be gradually moved downward by the rotating damper 113 to thereby be fixed at the second position.

Figure 19:
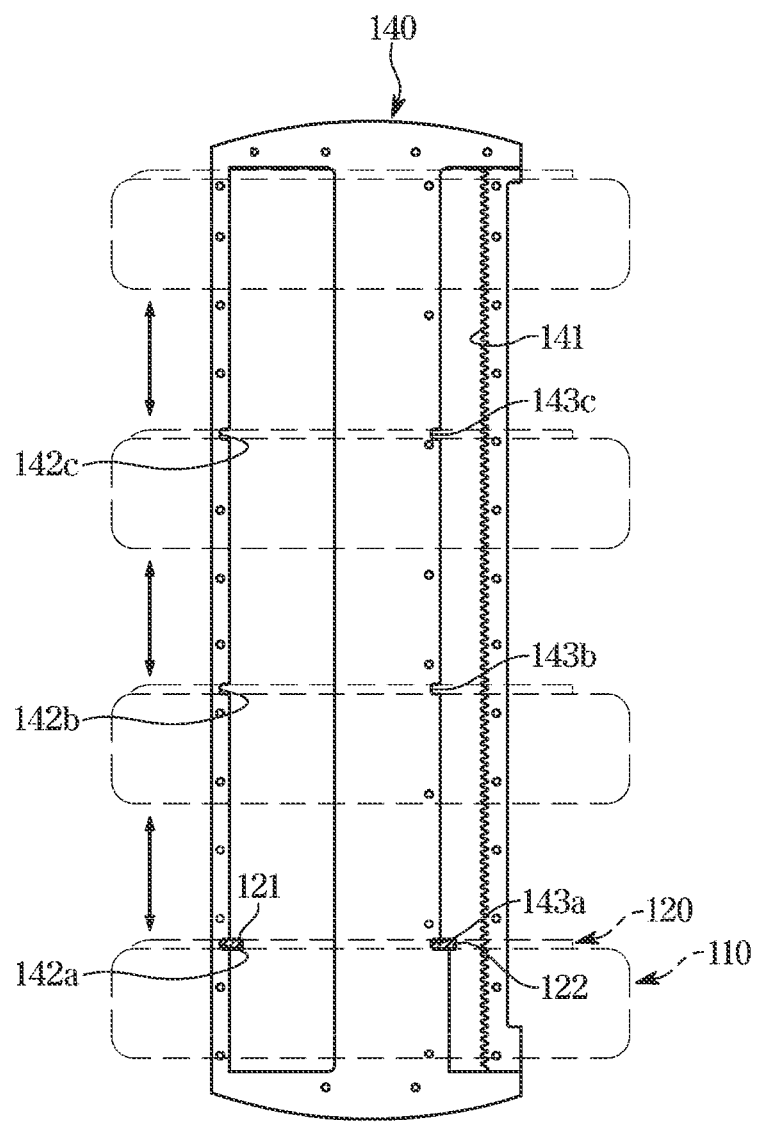
FIG. 19 is a view illustrating a refrigerator according to another embodiment of the disclosure, which separately shows a sliding plate and a mount.

FIG. 19 is a view illustrating a refrigerator according to another embodiment of the disclosure, which separately shows a sliding plate and a mount.

Referring to FIG. 19, according to the embodiment of the disclosure, a display module may be provided to be fixed at other positions in addition to the first position and the second position. For example, the display module may be fixed at first to fourth positions. To this end, the rack plate 140 may include a first-a locking groove 142a, a first-b locking groove 142b, and a first-c locking groove 142c that are spaced apart from each other in the upper side and lower side direction. In addition, the rack plate 140 may include a second-a locking groove 143a, a second-b locking groove 143b, and a second-c locking groove 143c that are spaced apart from each other in the upper side and lower side direction.

The display module may be fixed at one of the first to fourth positions. When the first position is the highest position and the fourth position is the lowest position, the user may push the push member to release the locking of the display module on the first to third positions. The display module may not need to be locked, when fixed at the fourth position.

Figure 20:
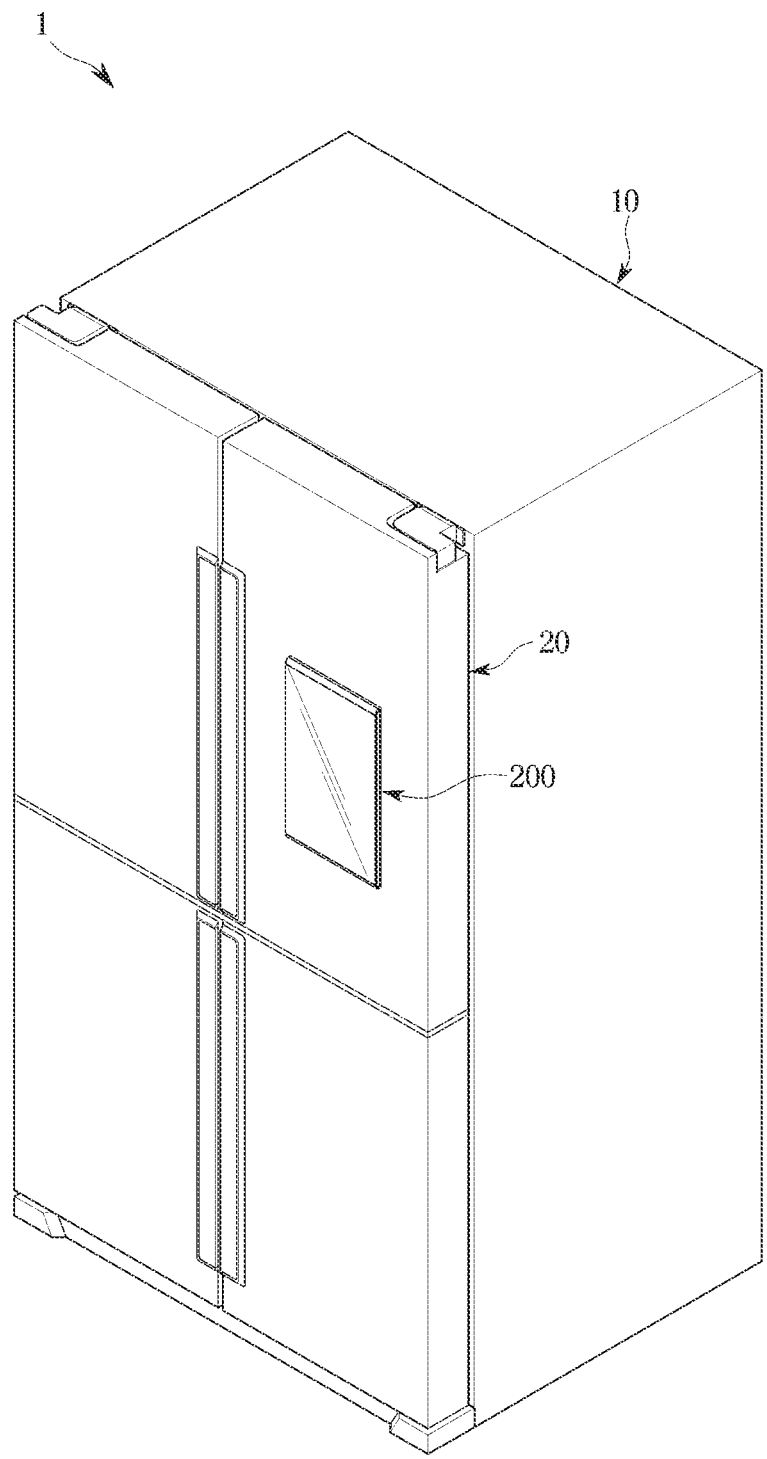
FIG. 20 is a perspective view illustrating a refrigerator according to still another embodiment of the disclosure.

FIG. 20 is a perspective view illustrating a refrigerator according to still another embodiment of the disclosure.

Referring to FIG. 20, a display module 200 of a refrigerator according to the embodiment of the disclosure may not include a push member. The display module 200 according to the embodiment of the disclosure may be provided to be movable from the first position to the second position without a push member. The user may release the fixing state of the display module 200 onto the first position by applying a predetermined force to the display module 200 fixed at the first position. The display module 200 released from the locking onto the first position may gradually move to the second position by the self-load.

The display module 200 according to the embodiment of the disclosure may be provided to be rotatable not only counterclockwise but also clockwise. The detailed structure thereof will be described below.

Figure 21:
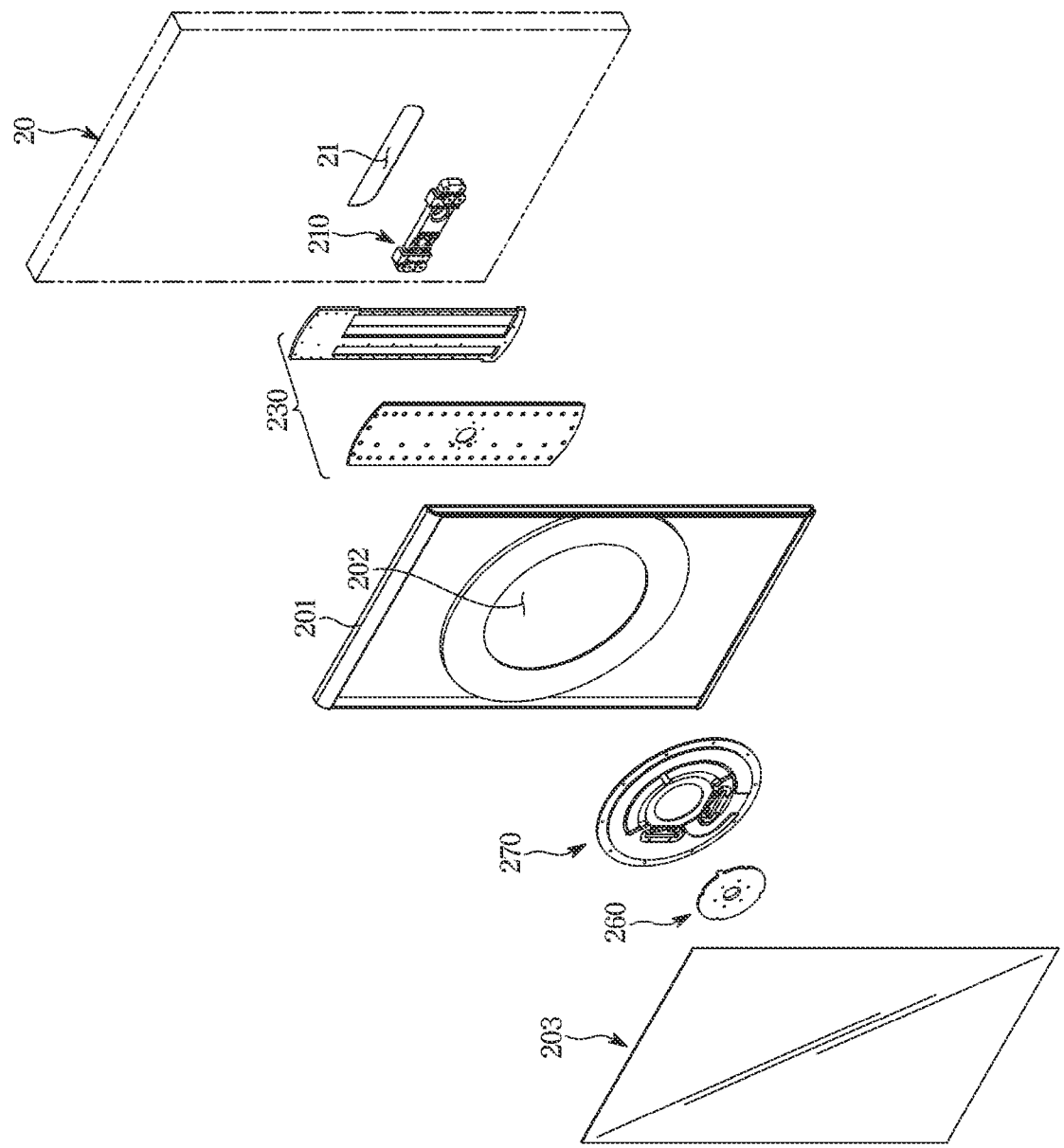
FIG. 21 is an exploded perspective view illustrating a refrigerator according to still another embodiment of the disclosure, showing a state in which a display module and a connection device are disassembled.

FIG. 21 is an exploded perspective view illustrating the refrigerator according to the embodiment of the disclosure, which shows a state in which a display module and a connection device are disassembled.

Hereinafter, configurations identical to those described above will be omitted.

Referring to FIG. 21, the display module 200 may include a mount 210 and a sliding plate 230, and may not include a lock release device as described above. In addition, a display housing 201 may not include a first elastic member. In the display module 200, a display 203 for displaying a screen is provided in a substantially quadrangular shape. The display module may include a display housing 201 and a housing hole 202. The display housing 201 and the housing hole 202 are identical to the display housing 101 and the housing hole 102.

Figure 22:
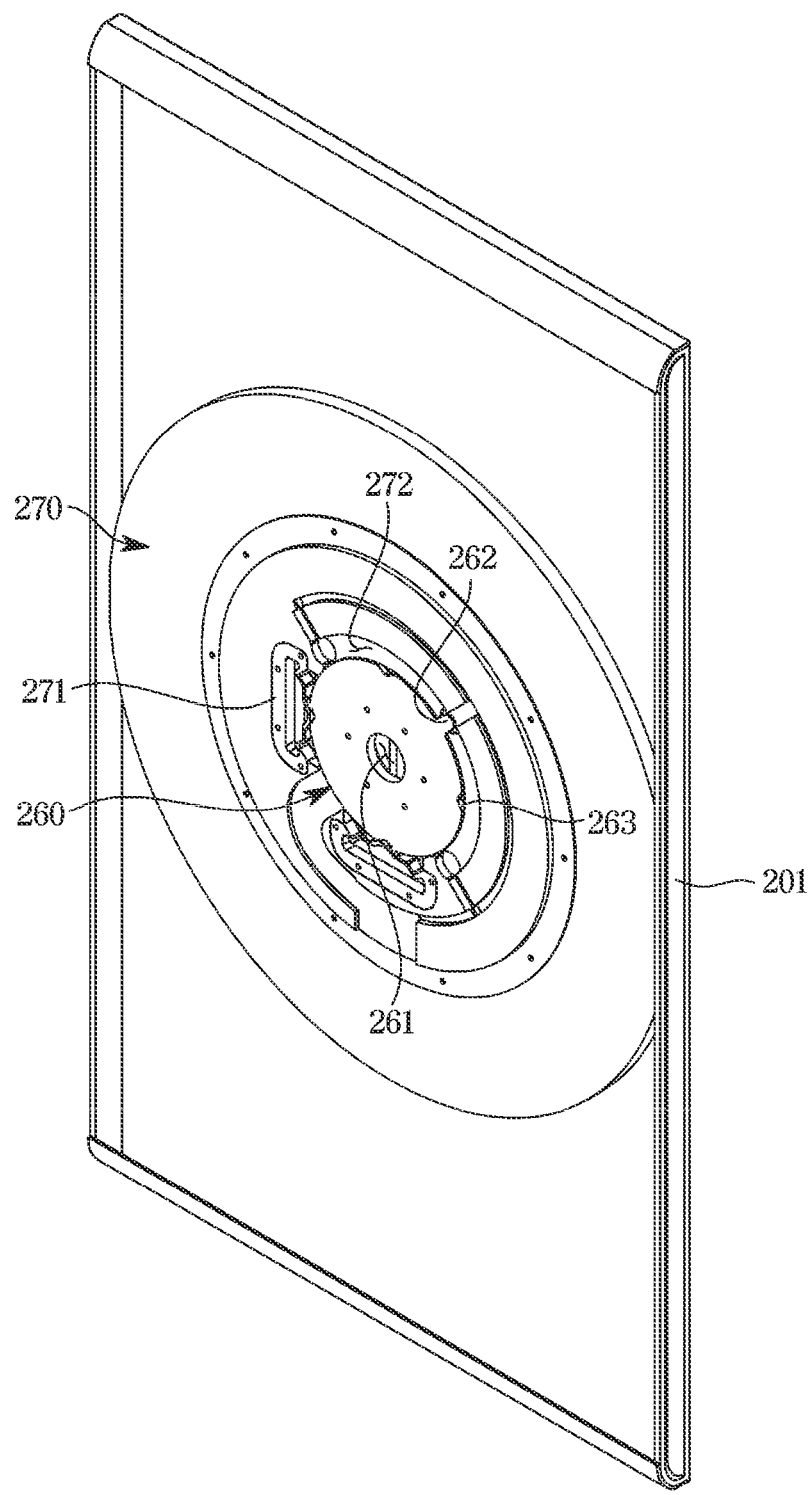
FIG. 22 is a view illustrating a refrigerator according to still another embodiment of the disclosure, showing an internal structure of a display module.
Figure 23:
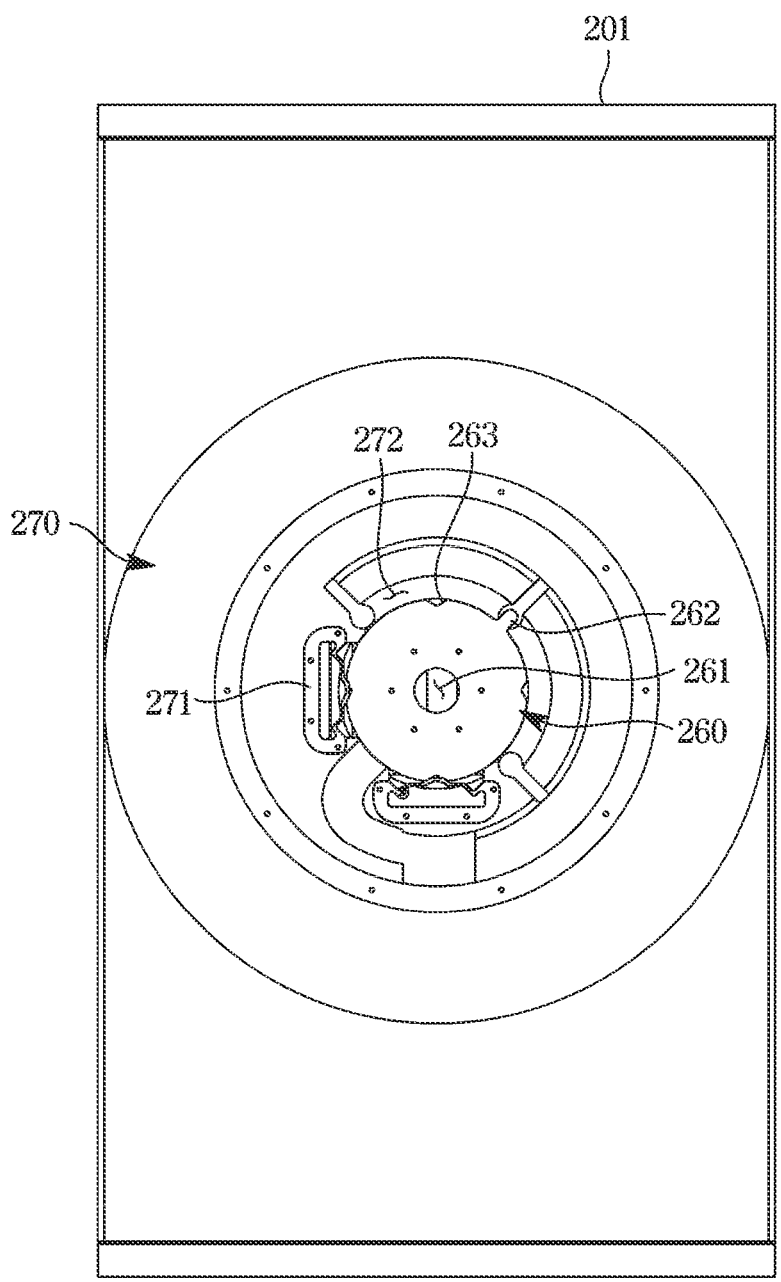
FIG. 23 is a front view illustrating a refrigerator according to still another embodiment of the disclosure, showing an internal structure of a display module in a portrait mode of the display module.
Figure 24:
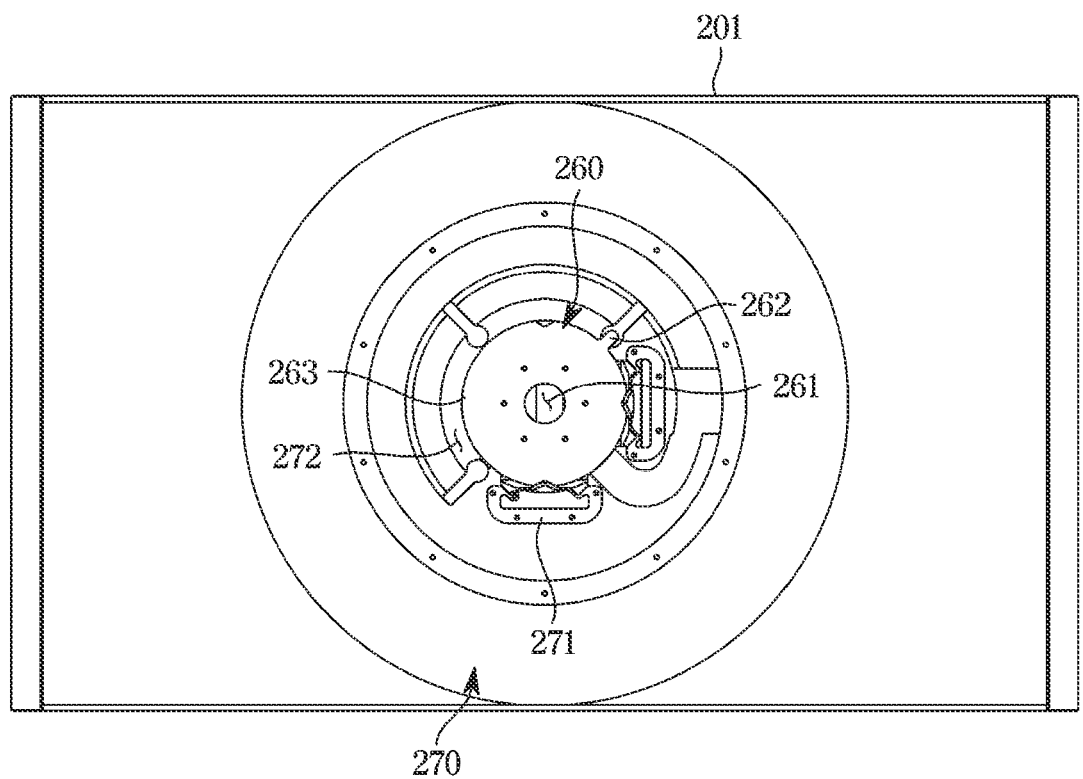
FIG. 24 is a front view illustrating a refrigerator according to still another embodiment of the disclosure, showing an internal structure of a display module in a landscape mode of the display module.

FIG. 22 is a view illustrating the refrigerator according to the embodiment of the disclosure, showing an internal structure of the display module. FIG. 23 is a front view illustrating portrait mode the refrigerator according to the embodiment of the disclosure, showing an internal structure of the display module when the display module is arranged in a portrait mode. FIG. 24 is a front view illustrating the refrigerator according to the embodiment of the disclosure, showing an internal structure of the display module when the display module is arranged in a landscape mode.

Referring to FIGS. 22 to 24, the display module 200 according to the embodiment of the disclosure may be provided to be rotatable clockwise and counterclockwise.

A rotating plate 270 includes a stopper groove 272, and a fixed plate 260 may include a stopper 262. The stopper groove 272 may be formed in a range of approximately 180 degrees. That is, the stopper 262 may be provided to be movable within a range of approximately 180 degrees. Therefore, according to the embodiment of the disclosure, the rotation direction of the display module 200 may be provided such that the display module 200 rotates clockwise and counterclockwise when rotating from the portrait mode to the landscape mode. The fixed plate 260 may include a third wire hole 261, a catching groove 263 and a catching protrusion 271. The third wire hole 261, the catching groove 263 and the catching protrusion 271 are identical to the third wire hole 161, the catching groove 163 and the catching protrusion 171.

Figure 25:
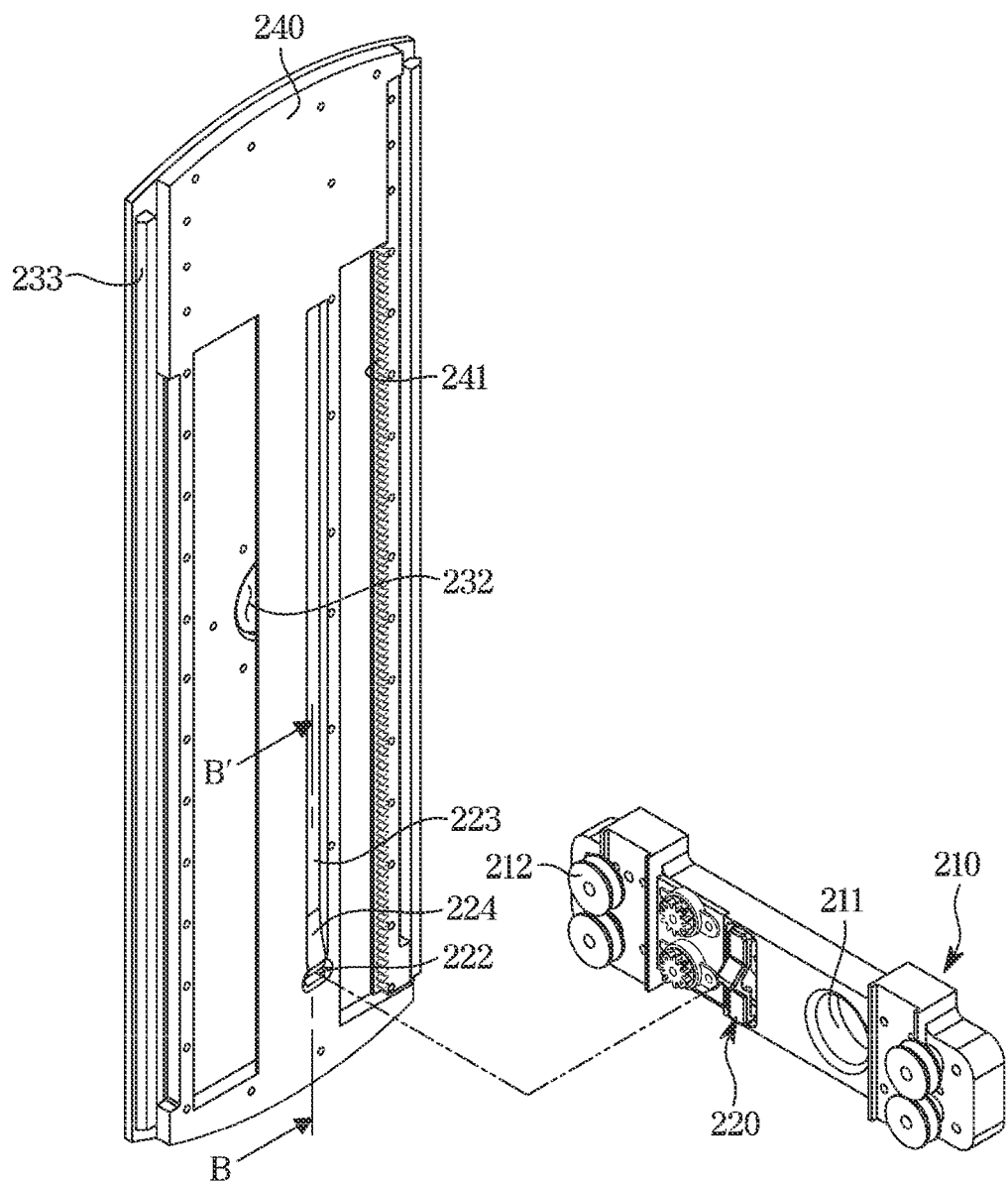
FIG. 25 is a view illustrating a refrigerator according to another embodiment of the disclosure, which separately shows a sliding plate and a mount.
Figure 26:
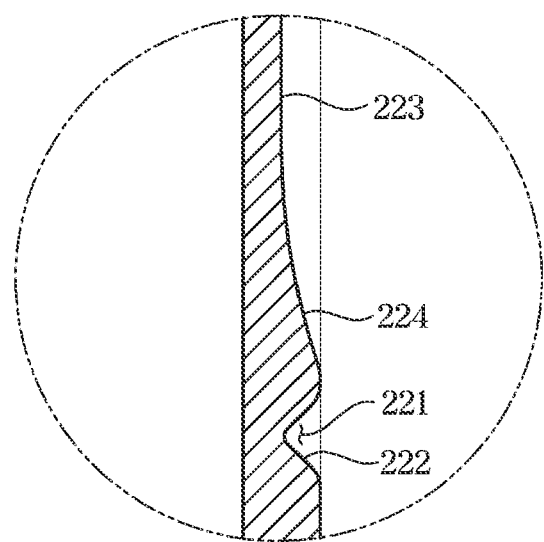
FIG. 26 is a cross-sectional view taken along line B-B of FIG. 25, which shows the sliding plate.

FIG. 25 is a view illustrating the refrigerator according to the embodiment of the disclosure, separately showing the sliding plate and the mount. FIG. 26 is a cross-sectional view taken along line B-B of FIG. 25, which shows the sliding plate.

Hereinafter, the locking and unlocking operation of the display module 200 according to the embodiment of the disclosure will be described in detail with reference to FIGS. 25 and 26.

Referring to FIGS. 25 and 26, the mount 210 may include an elastic protrusion 220 protruding toward the sliding plate 230. The sliding plate 230 may include a position securing groove 221 into which the elastic protrusion 220 is inserted. The display module may include a mount hole 211, rollers 212, a first wire hole 232, a rail 233 and a rack 241. The mount hole 211, rollers 212, the first wire hole 232, the rail 233 and the rack 241 are identical to the mount hole 111, the rollers 112, the first wire hole 132, the rail 133 and the rack 141.

The elastic protrusion 220 may include a material having elasticity. The elastic protrusion 220 may be provided to be elastically deformed to be moved within a predetermined range in the front-rear direction.

The position securing groove 221 may include a first guide surface 222 that is inclined for the elastic protrusion 220 to be withdrawn from the position securing groove 221 when a force greater than the elastic force of the elastic protrusion 220 is applied to the display module 200. The first guide surface 222 may be provided to be inclined to guide the elastic protrusion 220 to be withdrawn from the position securing groove 221 or to be inserted into the position securing groove 221.

The sliding plate 230 may further include a guide groove 223 for guiding the elastic protrusion 220 withdrawn from the position securing groove 221. The guide groove 223 may extend in the upper side and lower side direction, and may restrict the movable range of the display module 200 in the upper side and lower side direction.

A second guide surface 224 may be formed between the guide groove 223 and the position securing groove 221. The second guide surface 224 may guide the elastic protrusion 220 withdrawn out from the position securing groove 221 to be smoothly inserted into the guide groove 223. In addition, the second guide surface 224 may guide the elastic protrusion 220 to be smoothly inserted from the guide groove 223 into the position securing groove 221. The second guide surface 224 may be formed to be inclined, similar to the first guide surface 222.

When the elastic protrusion 220 is inserted into the position securing groove 221, the display module 200 may be kept fixed at the first position. In other words, the display module 200 may be locked onto the first position.

When the user applies a predetermined force downward to the display module 200, the elastic protrusion 220 may be withdrawn from the position securing groove 221. When the elastic protrusion 220 is withdrawn from the position securing groove 221, the locking of the display module 200 onto the first position is released, and the display module 200 may gradually move from the first position to the second position.

A plurality of position securing grooves may be formed to be spaced apart from each other in the upper side and lower side direction such that the display module may be kept fixed at different positions between the first position and the second position. With such a configuration, when the display module is fixed at a different position, the locking of the display module may be released by applying a predetermined force, similar to the case in which the display module is fixed at the first position.

As is apparent from the above, a refrigerator including a display module of which the position is adjustable in the upper side and lower side directions can be provided.

A refrigerator including a rotatable display module can be provided.

A refrigerator securing the capacity of a storage compartment by a display module disposed outside a door can be provided.

A refrigerator having a simple design without having a component protruding to the outside of the door when a display module rotates or moves up and down can be provided.

Although few embodiments of the disclosure have been shown and described, the above embodiment is illustrative purpose only, and it would be appreciated by those skilled in the art that changes and modifications may be made in these embodiments without departing from the principles and scope of the disclosure, the scope of which is defined in the claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A refrigerator comprising:
a main body forming a storage compartment;
a door configured to open and close the storage compartment;
a display module coupled to the door; and
a sliding plate disposed between the door and display module, the sliding plate coupled to be slidable in an upper side direction and a lower side direction with respect to the door, the sliding plate configured to allow the display module to be rotatably coupled thereto,
wherein the display module includes (i) a fixed plate disposed at an inside of the display module and coupled to the sliding plate and (ii) a rotating plate disposed between the fixed plate and the sliding plate and provided to be rotatable with respect to the fixed plate and the sliding plate, and
wherein the display module is provided to:
when the sliding plate slides in the upper side and lower side directions, slide in the upper side and lower side directions with respect to the door together with the sliding plate, and
rotate with respect to the door as the display module rotates with respect to the sliding plate.

2. The refrigerator of claim 1, wherein the sliding plate does not protrude outside of the display module when the display module moves in the upper side and lower side directions or rotates.

3. The refrigerator of claim 1, wherein the display module has a short side that has a height that is greater than or equal to a height of the sliding plate.

4. The refrigerator of claim 1, further comprising:
a mount fixed to the door and configured to allow the sliding plate to be slidably coupled thereto; and
a lock release device configured to release locking of the display module when the display module is locked from moving in the upper side and lower side directions.

5. The refrigerator of claim 4, further comprising a locking member coupled to the mount, the locking member configured to be movable in a first direction with respect to the mount and a second direction opposite to the first direction,
wherein the locking member is configured to be inserted into a locking groove formed in a rear surface of the sliding plate to restrict an upper side and a lower side movement of the sliding plate.

6. The refrigerator of claim 5, further comprising an elastic spring coupled to the mount and the locking member to elastically bias the locking member in the first direction.

7. The refrigerator of claim 4, wherein: the mount includes a roller rotatably coupled to the mount, and the sliding plate further includes a rail that guides movement of the roller.

8. The refrigerator of claim 7, wherein:
the sliding plate further comprises a rack provided in parallel with the rail, and
the mount includes a rotating damper having a pinion mating with the rack, the rotating damper configured to adjust a rotation speed of the pinion to adjust a moving speed of the sliding plate.

9. The refrigerator of claim 1, wherein:
the fixed plate includes a stopper that protrudes from the fixed plate, and
the rotating plate includes a stopper groove configured to restrict a movable range of the stopper to restrict a rotatable range of the display module.

10. The refrigerator of claim 1, further comprising:
a mount fixedly coupled to the door and including an elastic protrusion protruding toward the sliding plate; and
a position securing groove formed in a rear surface of the sliding plate and into which the elastic protrusion is configured to be inserted,
wherein when the elastic protrusion is inserted into the position securing groove, the display module is configured to be kept in a position.

11. The refrigerator of claim 10, wherein the position securing groove has a first guide surface that is inclined for the elastic protrusion to be withdrawn from the position securing groove when a predetermined force is applied to the display module.

12. The refrigerator of claim 11, wherein the sliding plate further comprises:
a guide groove configured to guide the elastic protrusion withdrawn from the position securing groove; and
a second guide surface inclined to guide movement of the elastic protrusion between the position securing groove and the guide groove.

13. A refrigerator comprising:
a main body forming a storage compartment;
a door configured to open and close the storage compartment;
a display module coupled to the door so as to be movable in upper side and lower side directions and rotatable with respect to the door; and
a sliding plate disposed between the door and the display module such that the display module is coupled to be movable in the upper side and lower side directions and rotatable with respect to the door, the sliding plate coupled to be slidable in the upper side and lower side directions with respect to the door and configured to allow the display module to be rotatably coupled thereto,
wherein the display module includes (i) a fixed plate disposed at an inside of the display module and coupled to the sliding plate and (ii) a rotating plate disposed between the fixed plate and the sliding plate and provided to be rotatable with respect to the fixed plate and the sliding plate.

14. The refrigerator of claim 13, wherein:
the display module includes a rotation groove formed in a rear surface thereof and into which the sliding plate is configured to be inserted, and
the rotation groove has a diameter greater than or equal to a height of the sliding plate and smaller than or equal to a height of a short side of the display module.

15. The refrigerator of claim 13, further comprising:
a mount fixed to the door and configured to allow the sliding plate to be slidably coupled thereto;
a locking groove formed in a rear surface of the sliding plate; and
a locking member configured to be inserted into the locking groove to keep the display module in a position, the locking member coupled to the mount so as to be movable in a first direction with respect to the mount or a second direction opposite to the first direction.

* * * * *